United States Patent [19]

Sarovich

[11] 4,136,767
[45] Jan. 30, 1979

[54] VACUUM OPERATED CAN-CONVEYING AND CAN-UPRIGHTING APPARATUS

[75] Inventor: Steve Sarovich, Oak Brook, Ill.

[73] Assignee: The Sardee Corporation, Alsip, Ill.

[21] Appl. No.: 871,092

[22] Filed: Jan. 19, 1978

Related U.S. Application Data

[63] Continuation of Ser. No. 741,468, Nov. 12, 1976, abandoned.

[51] Int. Cl.² ........................................... B65G 15/58
[52] U.S. Cl. .................................... 198/689; 198/445
[58] Field of Search ............... 198/404, 445, 689, 862; 214/1 Q, 1 BV; 271/186, 197

[56] References Cited

U.S. PATENT DOCUMENTS

| 3,477,558 | 11/1969 | Fleischauer | 198/689 X |
| 3,760,453 | 9/1973 | Neumann | 198/689 X |
| 3,917,054 | 11/1975 | Hurst | 198/404 |

Primary Examiner—Robert W. Saifer
Assistant Examiner—James L. Rowland
Attorney, Agent, or Firm—Charles B. Cannon

[57] ABSTRACT

A feed-in can conveyor receives a bank of multiple rows of cans from a first work station, such as a can washing apparatus, and conveys them in inverted position, that is, with the open ends of the cans facing down and the closed bottom ends facing up, under a perforated endless can-carrying and can-uprighting conveyor belt which works over the peripheral surface of a rotary foraminous metal cylinder or drum. Vacuum is applied from a vacuum chamber or housing, and a first vacuum control device, to the perforated endless conveyor belt which lifts the cans off the feed-in can conveyor belt and the perforated endless conveyor belt "grabs" and holds the cans as they are carried by the perforated endless can-carrying and can-uprighting conveyor belt, with the closed bottoms of the cans disposed against the perforated endless conveyor belt, around approximately half of the peripheral surface or circumference of an air-permeable rotary foraminous metal drum or cylinder until they reach the top of the drum or cylinder where the vacuum from the vacuum chamber or housing, acting through a second and upper vacuum control device and the perforated endless conveyor belt, is cut off and the cans are delivered in upright position to a take-away or delivery conveyor by which they may be transported to a second work station, such as a printing and labeling apparatus, or the like.

26 Claims, 25 Drawing Figures

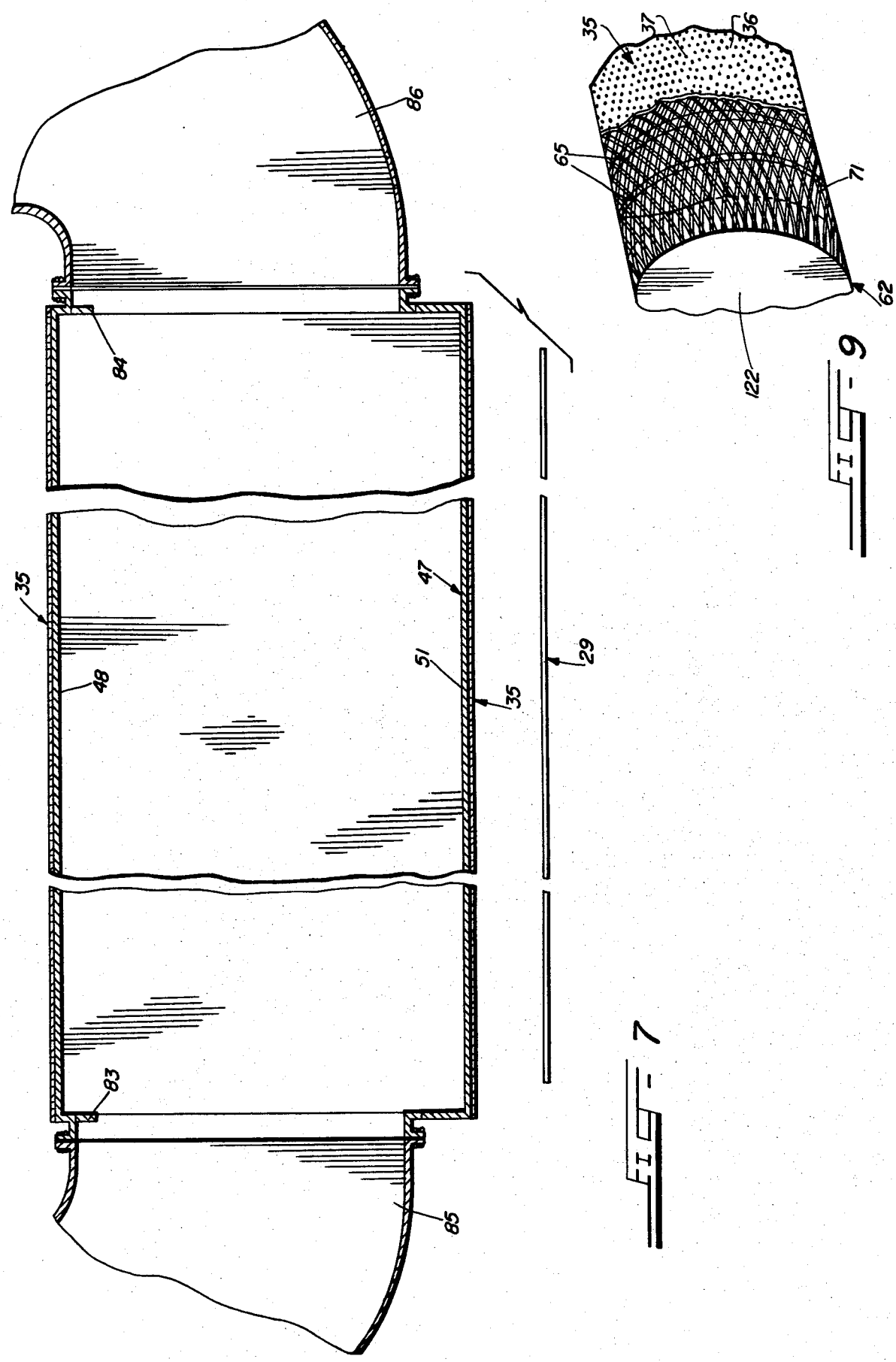

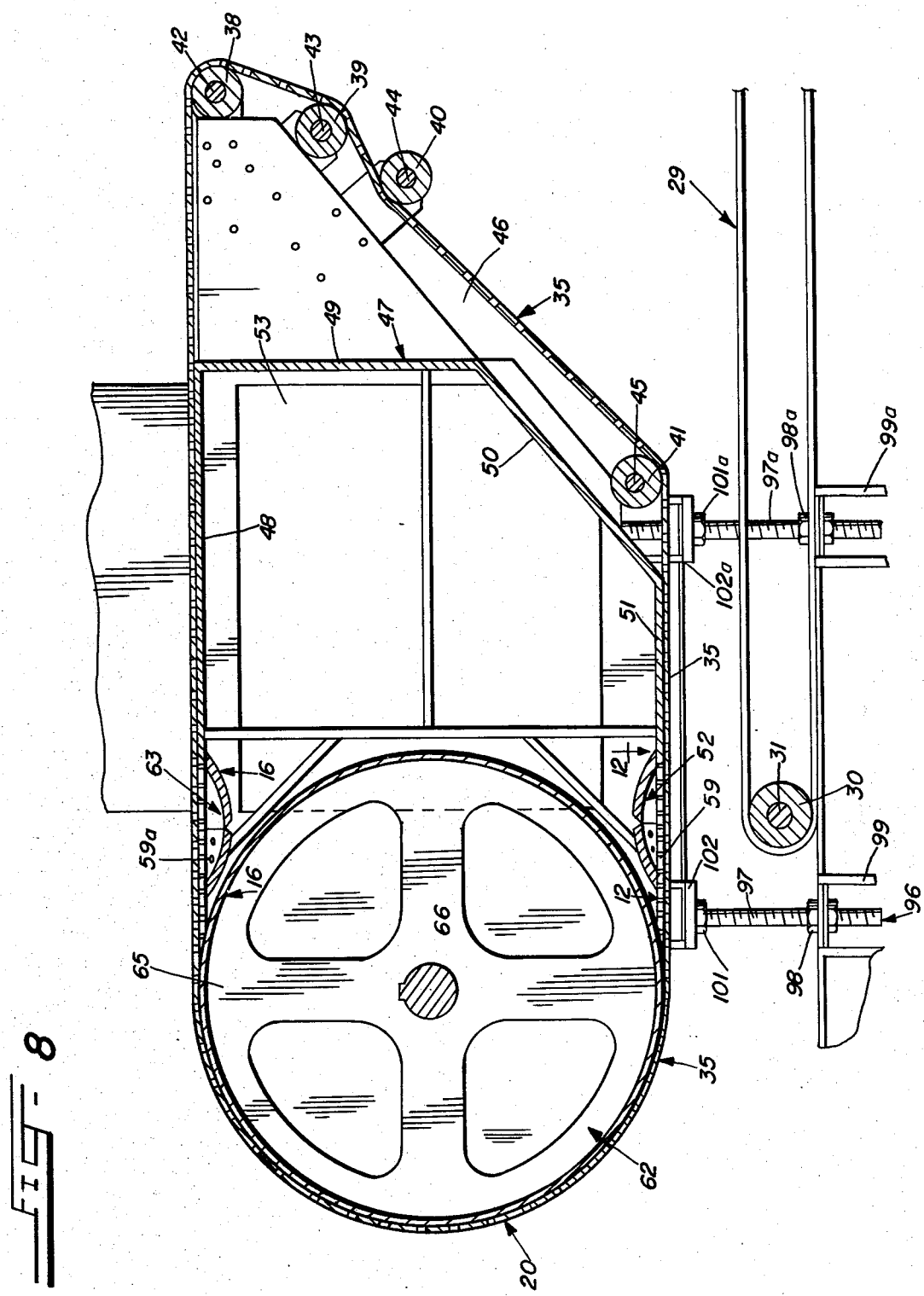

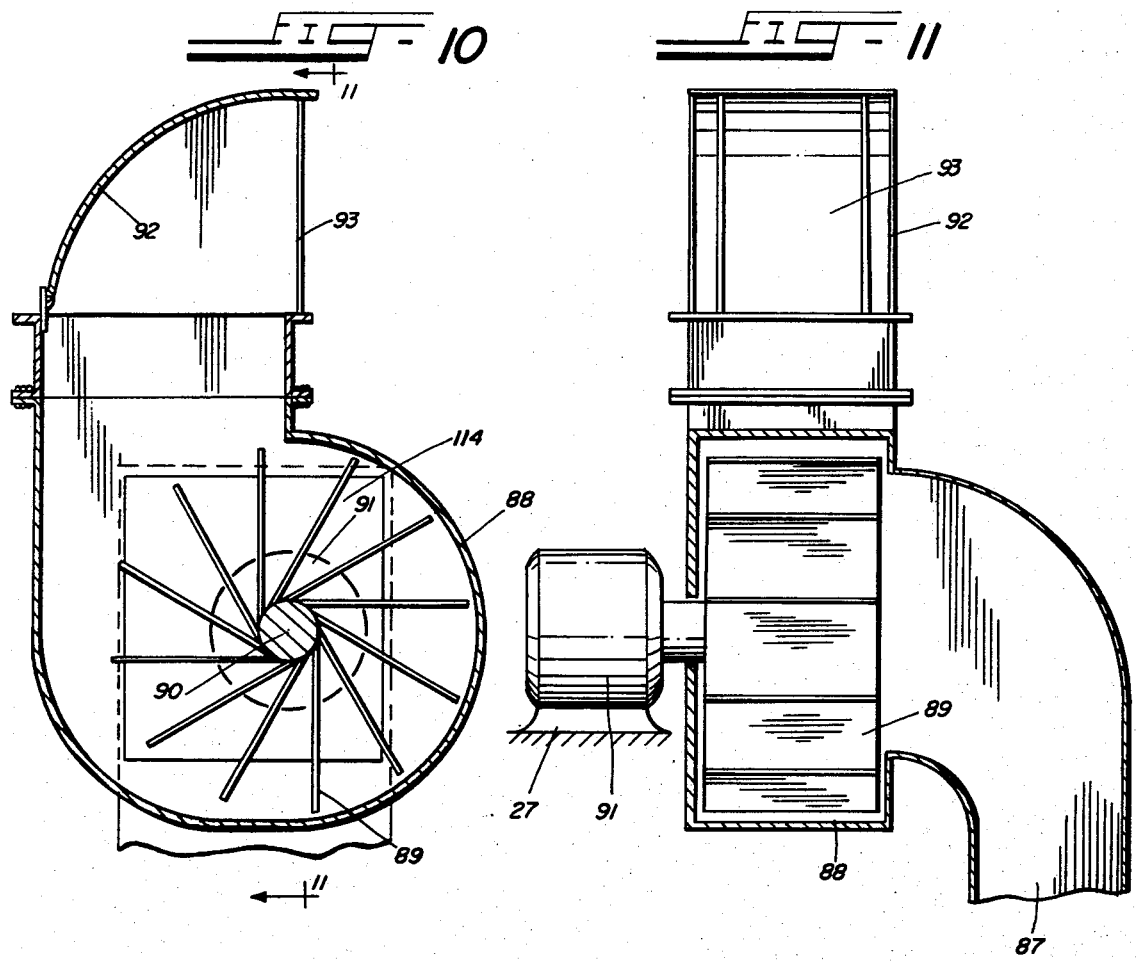
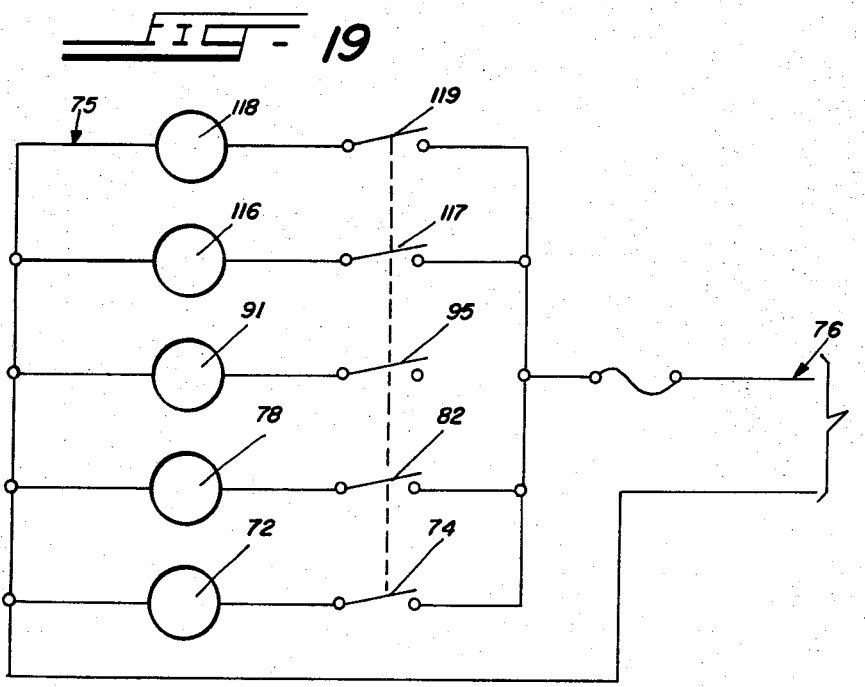

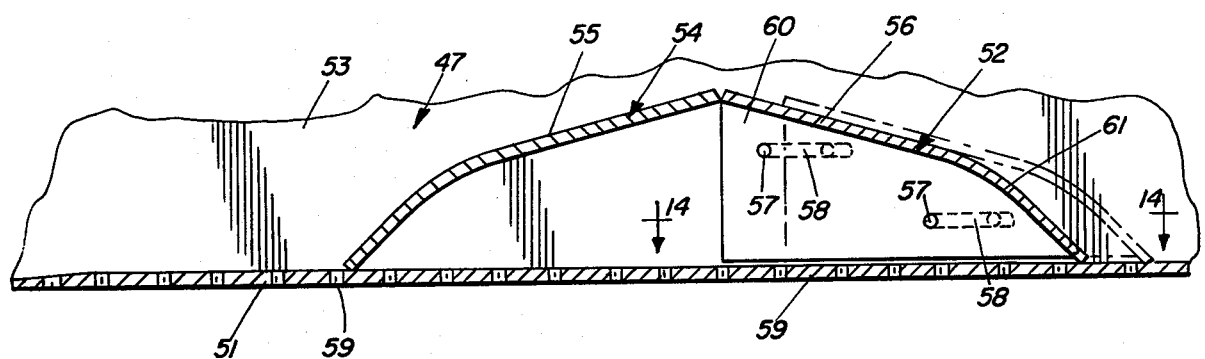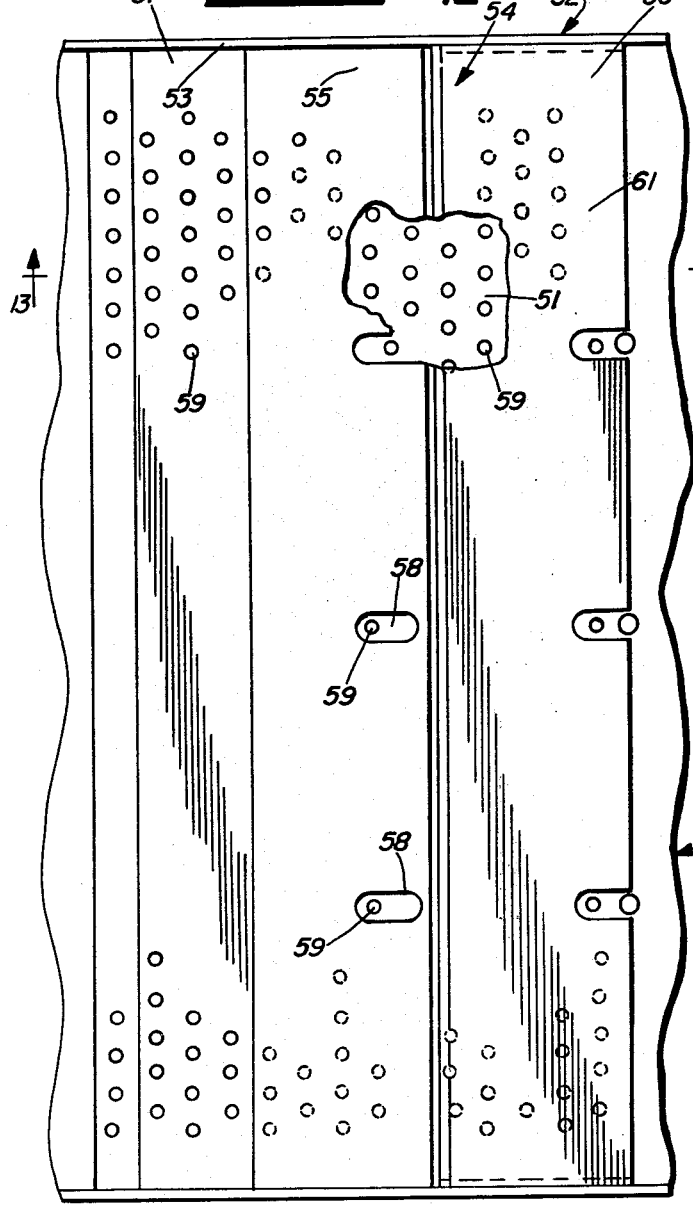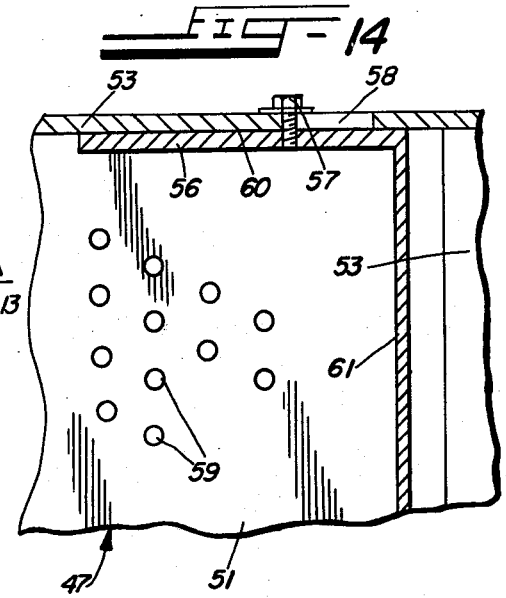

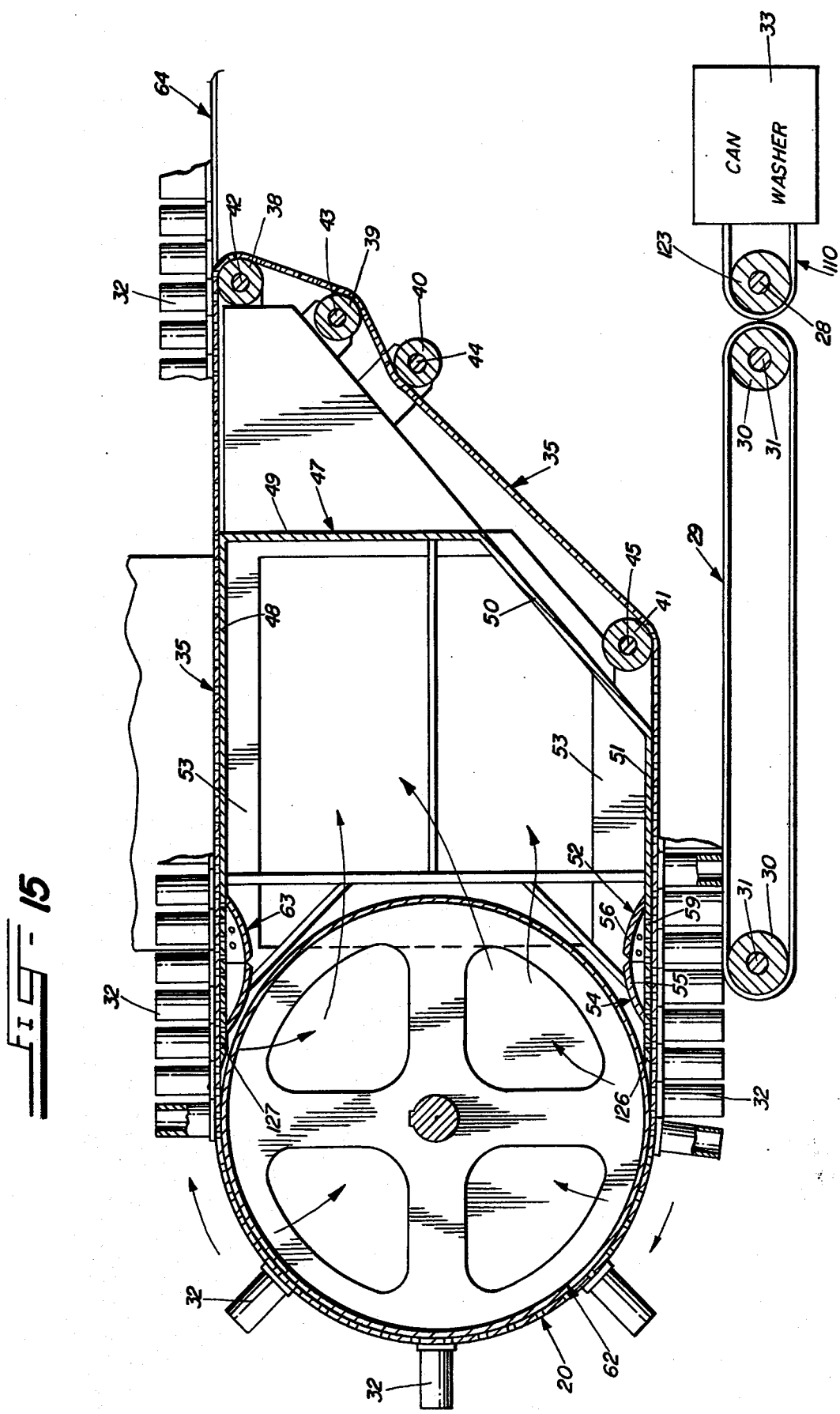

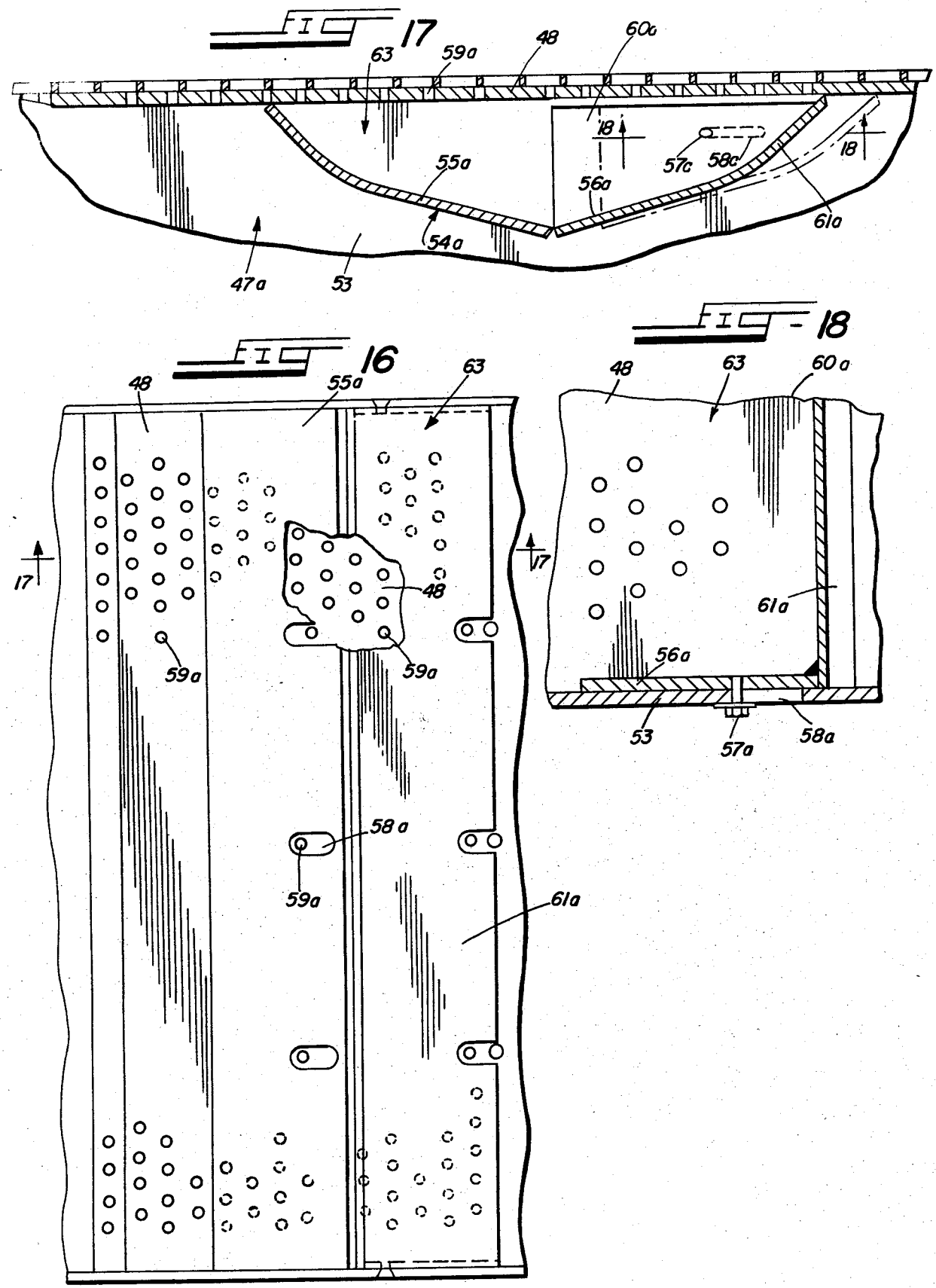

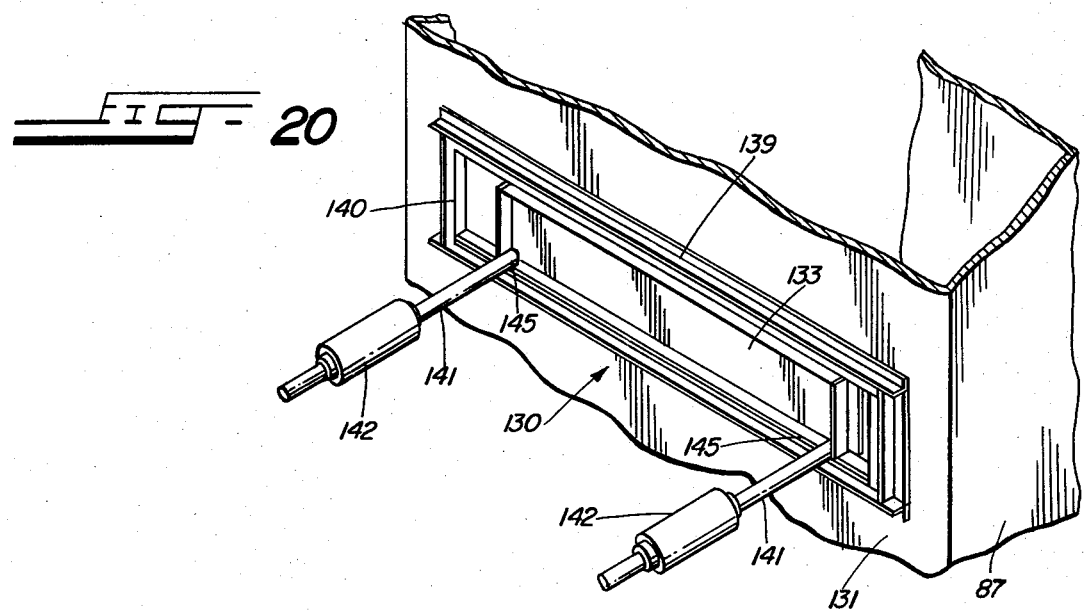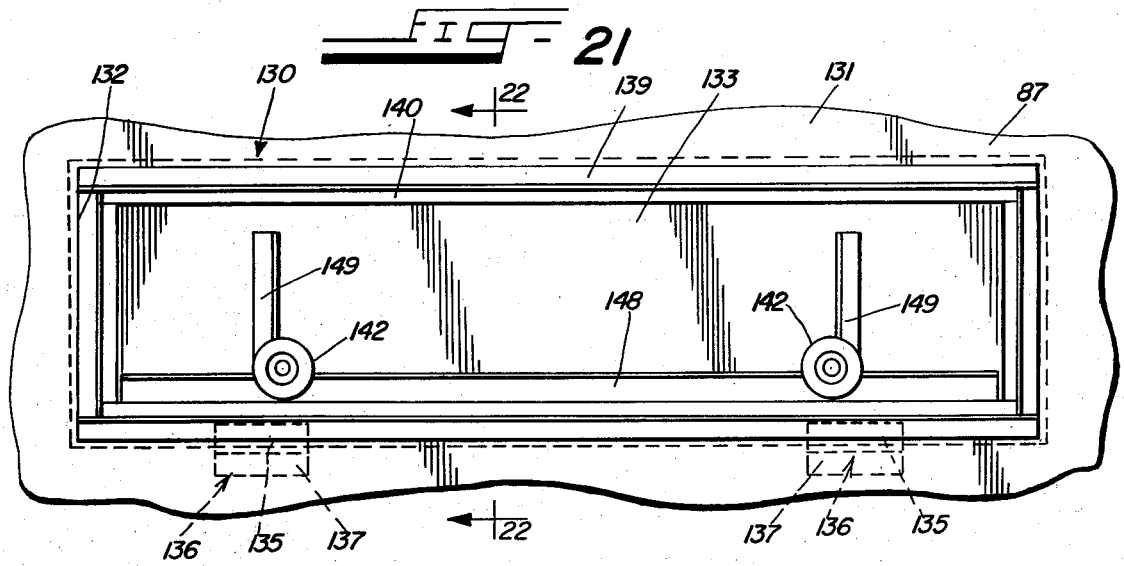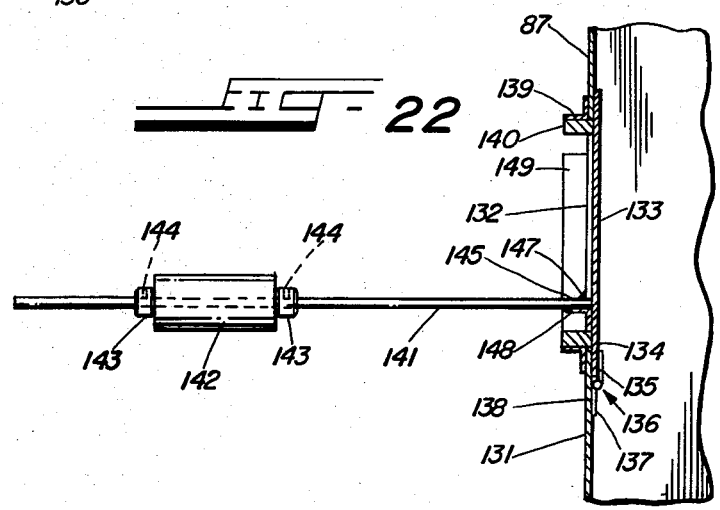

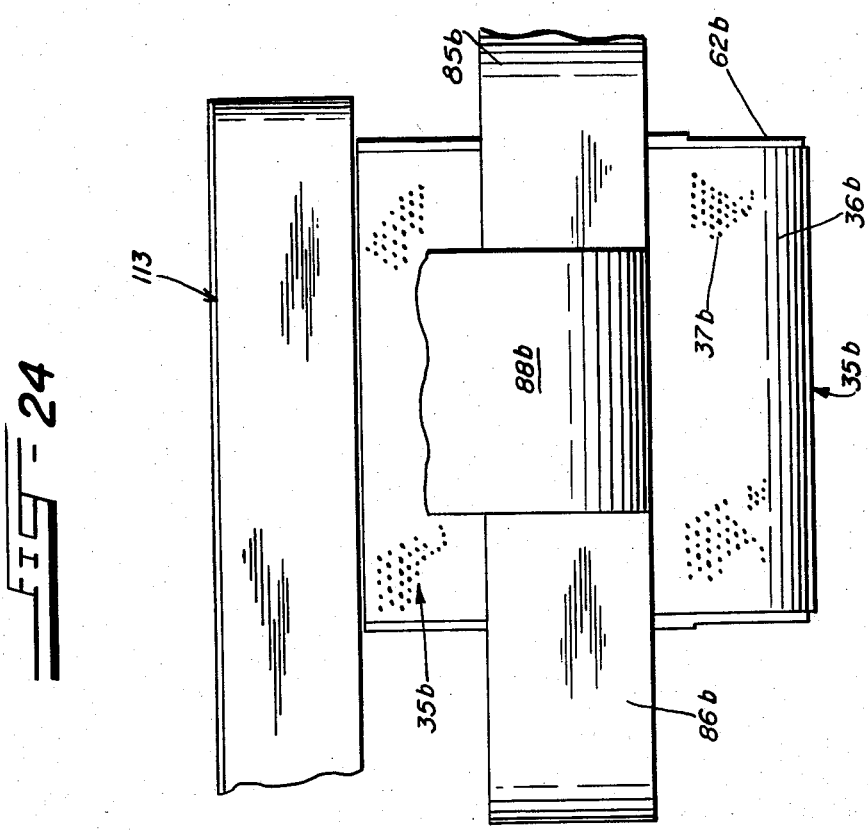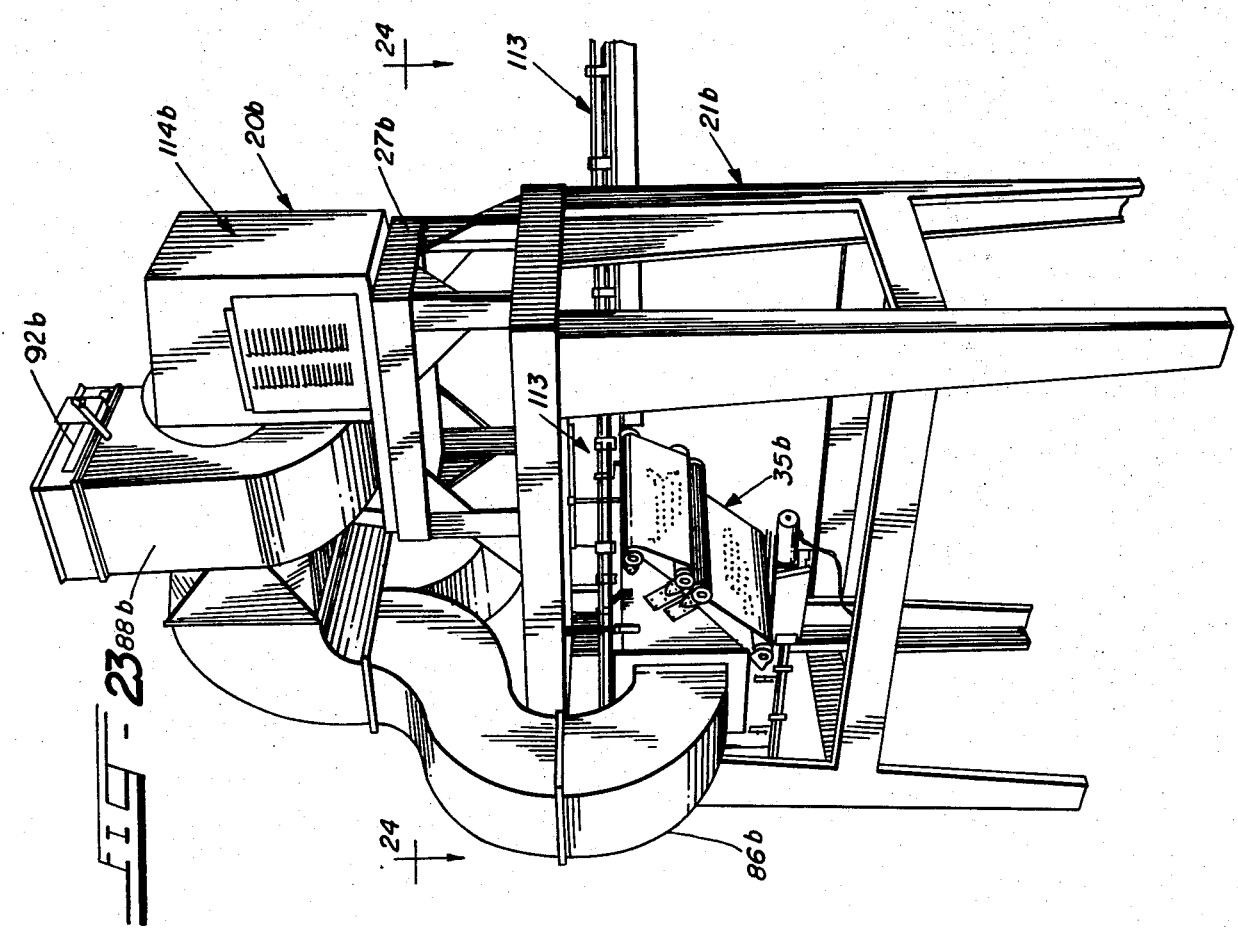

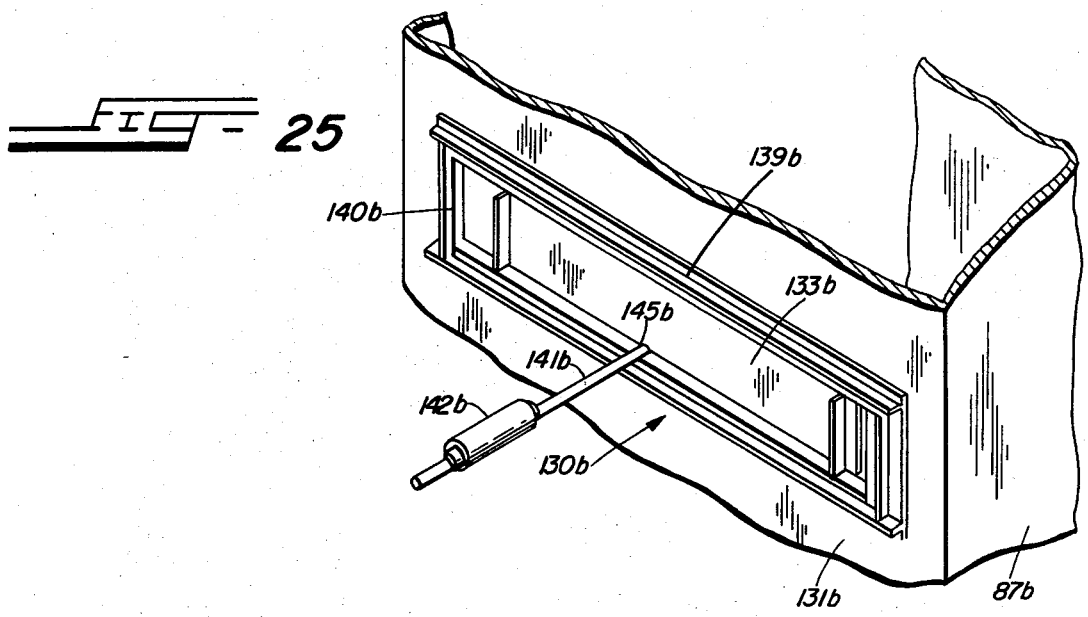

VACUUM OPERATED CAN-CONVEYING AND CAN-UPRIGHTING APPARATUS

This is a continuation application of application Ser. No. 741,648, filed Nov. 12, 1976, now abandoned.

BACKGROUND

Heretofore in the art of can-handling apparatus for handling metal cans it has been customary to remove the cans from a can-washing apparatus by means of conveyors in which the cans have been conveyed in a single file or row from the can-washing apparatus through an overhead conveyor and can-uprighting apparatus which uprights the cans from the inverted position in which they leave the can-washing apparatus, that is, with the open tops thereof facing downwardly, into a position in which the open tops or ends face upwardly, so that the cans may be delivered to the printing and labeling apparatus, or other work station, with the open tops facing upwardly. However, such prior overhead conveyors have had a number of drawbacks and disadvantages and among these are: (a) as the cans are moved through a single file or row through the overhead conveying and uprighting apparatus they tend to bump into each other with resulting damage to the cans, such as scuffing and denting, whih makes it difficult if not impossible to print or label such damaged cans; and (b) the production and speed of operation of such prior overhead can-handling conveyor apparatus, using a single file or row conveyor, has been relatively very slow, time consuming and inefficient.

OBJECTS

An object of the present invention is to provide a new and improved can-conveying and can-uprighting apparatus for conveying metal cans in a bank of multiple rows of cans, from a first work station, such as a can-washing apparatus to a second work station, such as a printing and labeling apparatus, or the like, in such a manner that the cans are uprighted from the inverted position in which they leave the can washer, that is, with the open tops of the cans facing downwardly and the closed bottom ends thereof facing upwardly, and are delivered in upright position to a delivery or take-away conveyor for delivery to the printing and labeling apparatus, or other work station.

An additional object of the invention is to provide a new and improved can-conveying and can-uprighting apparatus in which a bank of multiple rows of cans are delivered from the can-washing apparatus to the printing and labeling apparatus without denting, scuffing or other physical damage to the cans, such as has been experienced heretofore in the use of prior overhead conveyor can-handling and can-uprighting apparatus.

A further object of the invention is to provide a new and improved can-conveying and can-uprighting apparatus for delivery of metal cans from a can-washing apparatus to a printing and labeling apparatus, or other work station, in a bank of multiple rows of cans with resulting increased speed and high volume operation and corresponding economy and efficiency.

Still another object of the invention is to provide a new and improved can-conveying and can-uprighting apparatus which is adapted for conveying a bank consisting of any desired number of multiple rows of cans from a can-washing apparatus to a printing and labeling apparatus, or other work station, depending upon the size of the apparatus and the production needs of the user.

An additional object of the invention is to provide in the new can-conveying and can-uprighting apparatus novel conveyor means and vacuum means for conveying the cans from the can-washing apparatus to the printing and labeling appartus, or other work station, and for uprighting the position of the cans as they come from the can-washing apparatus in inverted position with their open tops facing downwardly into upright position with the open tops of the cans facing upwardly as they are delivered to the printing and labeling apparatus.

A further object of the invention is to provide in the new can-conveying and can-uprighting apparatus novel adjustable vacuum control means for controlling the degree of vacuum or static pressure which is applied to the cans as they are lifted off the can feed-in conveyor onto the perforated endless conveyor belt so as to adapt the new can-conveying and can-uprighting conveyor to cans of varying sizes and weights and to prevent the cans from falling off the feed-in conveyor or becoming misaligned as they leave the feed-in conveyor and are "grabbed" and carried by the perforated endless conveyor belt around the rotary foraminous metal drum or cylinder.

Still another object of the invention is to provide in the new can-conveying and can-uprighting apparatus novel adjustable vacuum control means for adjusting the degree of vacuum or static pressure applied to the cans as they are carried by the perforated endless conveyor belt away from the rotary foraminous metal drum or cylinder onto a delivery or take-away conveyor.

An additional object of the invention is to provide in the new can-conveying and can-uprighting apparatus novel means for adjusting the height of the assembly of the vacuum chamber or housing, the rotary foraminous metal drum or cylinder; and the perforated endless conveyor belt relative to the can feed-in conveyor so as to accommodate the new can-conveying and can-uprighting apparatus for use with cans of varying heights and sizes.

An additional object of the invention is to provide in the new can-conveying and can-uprighting apparatus novel means for enabling the vacuum ducts which lead from the vacuum chamber or housing to the high speed air exhaust fan housing to be adjusted vertically with the assembly of the vacuum chamber or housing, the rotary foraminous metal drum or cylinder, and the perforated flexible endless conveyor belt, relative to the feed-in can conveyor, so as to accommodate the new can-conveying and can-uprighting apparatus for use with cans of various sizes and heights.

A further object of the invention is to provide in the air duct exhaust system between the vacuum chamber or housing and the air exhaust outlet novel adjustable vacuum and static pressure control means for controlling and adjusting the degree of vacuum and static pressure in the vacuum chamber or housing and in the air duct exhaust system in relation to the can load on the perforated flexible endless conveyor belt and the resulting perforated area of the perforated conveyor belt as determined by the number of holes or perforations in the perforated endless conveyor belt which are closed by the cans being carried thereby over the external surface of the rotary foraminous metal drum or cylinder.

Other objects will appear hereinafter.

DESCRIPTION OF FIGURES IN THE DRAWINGS

Figure 3:
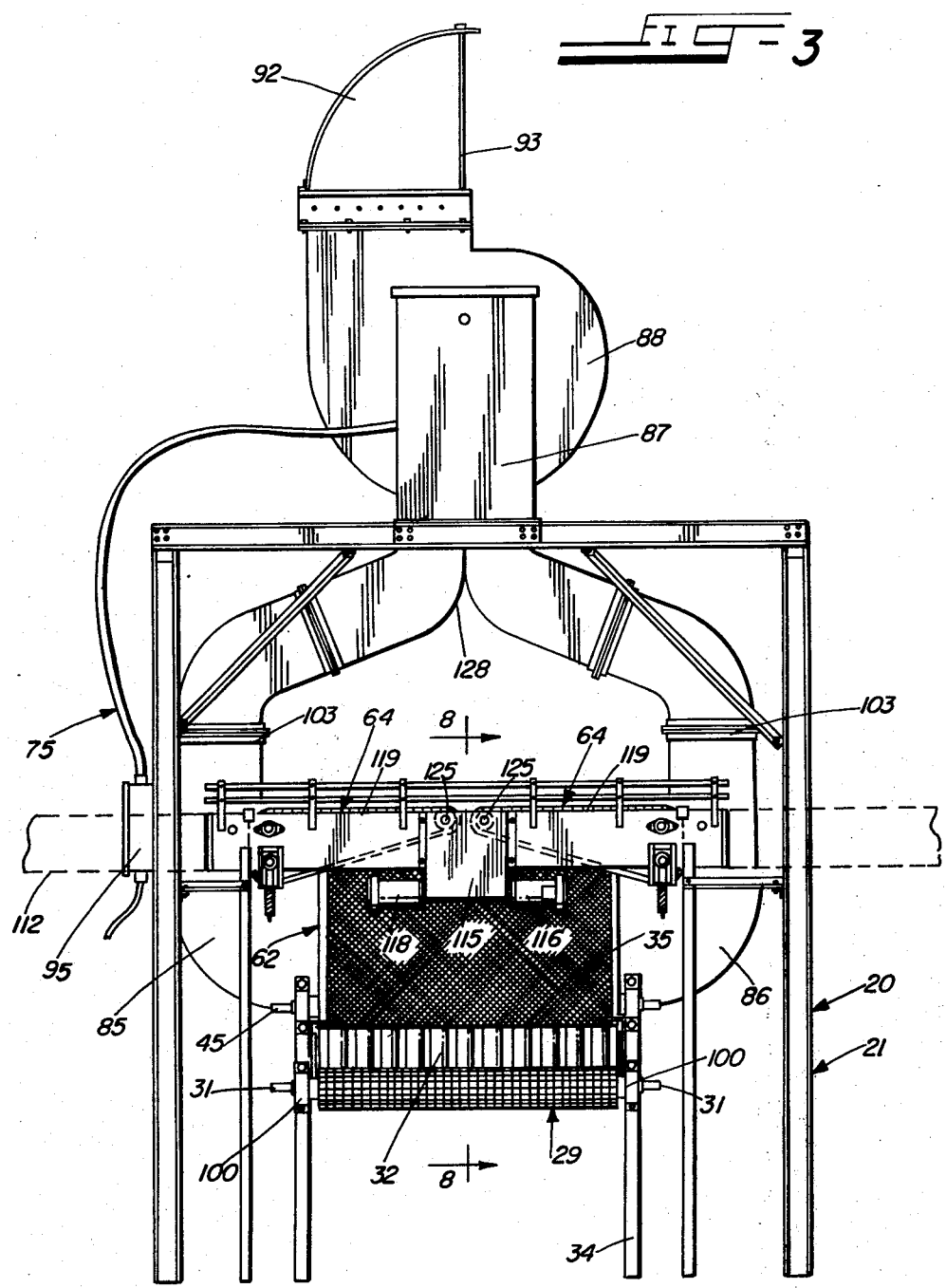
FIG. 3 is a rear elevational view of the can-conveying and can-uprighting apparatus shown in FIGS. 1 and 2.
Figure 4:
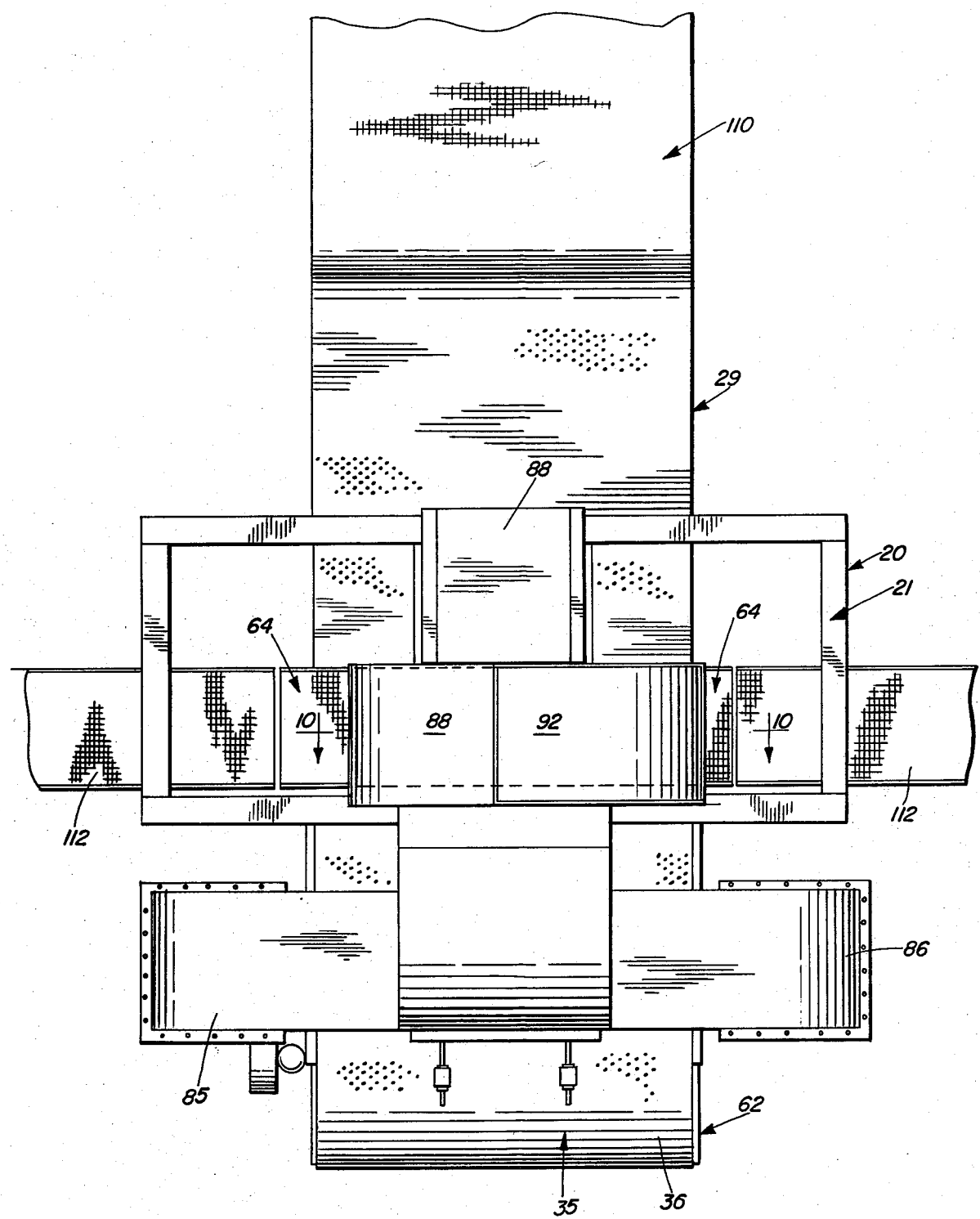
FIG. 4 is a top plan view on line 4-4 in FIG. 1.
Figure 5:
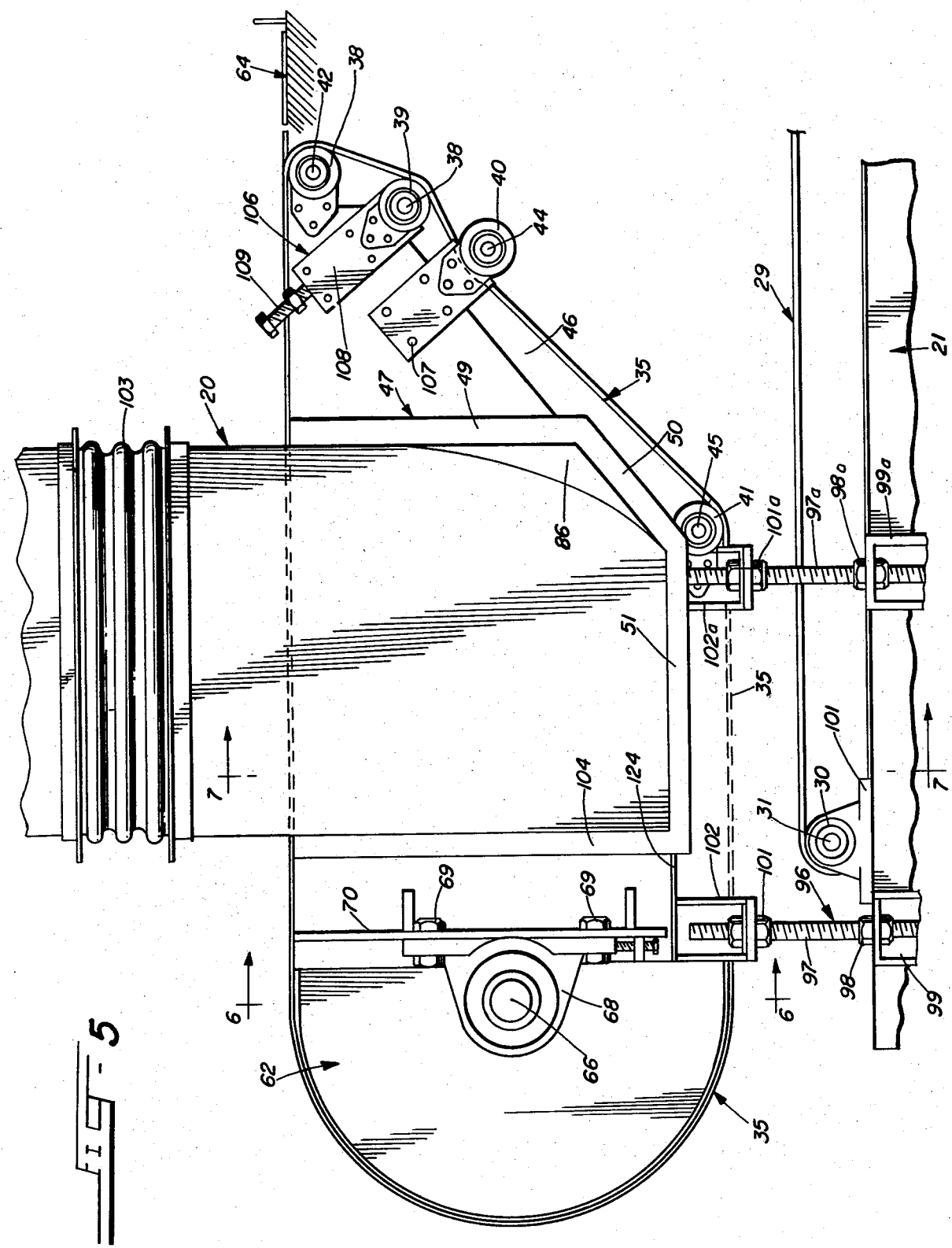
Figure 6:
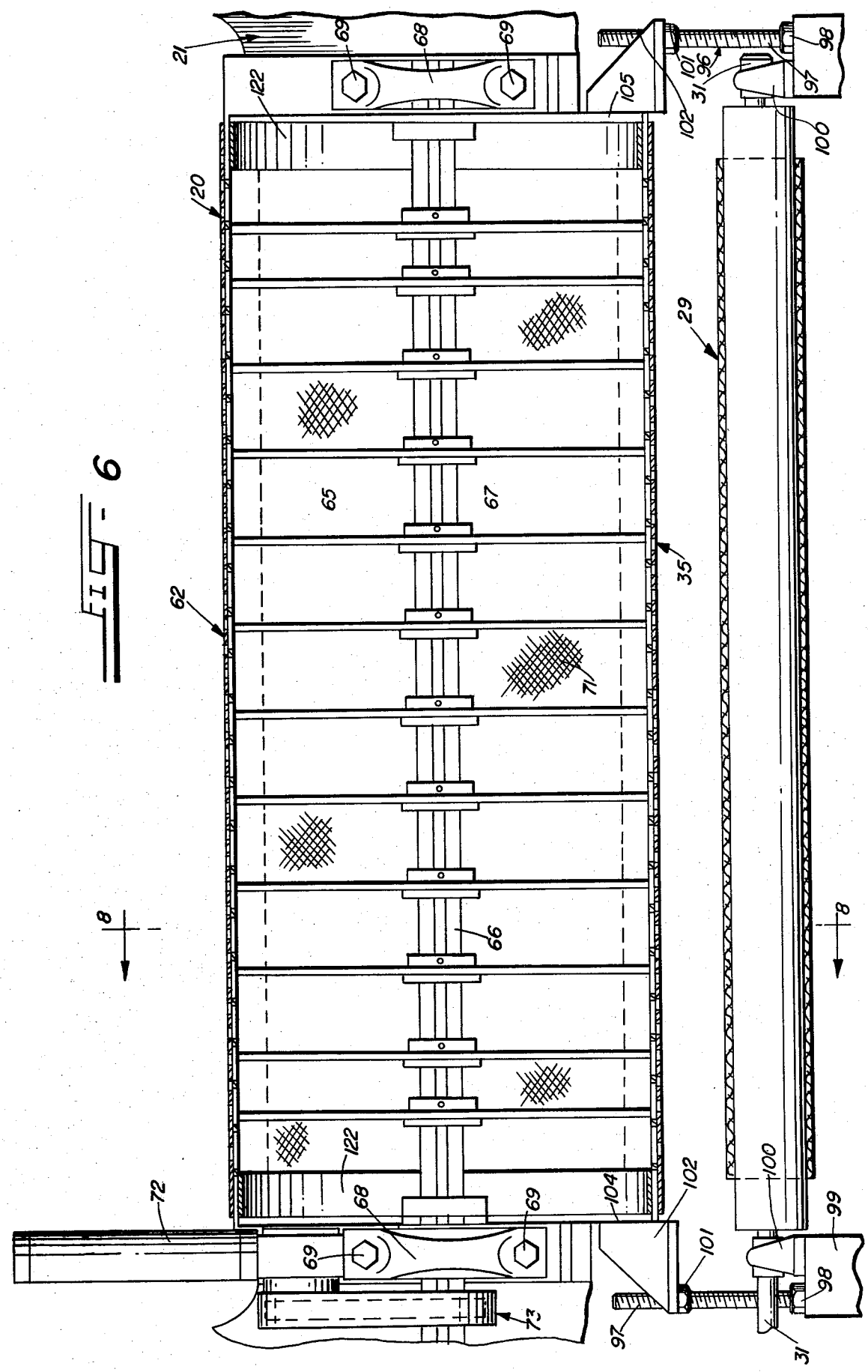

FIG. 5 is an enlarged side elevational view of the can-conveying and can-uprighting apparatus shown in FIGS. 1 to 4, inclusive, and illustrating the perforated flexible endless conveyor belt and feed-in or can-feeding conveyor, the rotary foraminous metal drum or cylinder, and the adjusting means embodied in the invention for adjusting the height of the vacuum chamber or housing, the rotary foraminous metal drum or cylinder, the perforated flexible endless conveyor belt and the vacuum ducts relative to the feed-in can conveyor so as to accommodate the new can-conveying and can-uprighting apparatus for use with cans of various heights and sizes;

FIG. 6 is a vertical view on line 6—6 in FIG. 5, partly in section and partly in elevation, illustrating the rotary foraminous metal cylinder or drum, the perforated flexible endless conveyor belt, the can feeding conveyor, and the adjusting means referred to above in the description of FIG. 5;

FIG. 7 is a vertical sectional view on line 7—7 in FIG. 5 illustrating the rotary foraminous metal drum or cylinder, the perforated endless conveyor belt and the can-feeding conveyor;

FIG. 8 is a vertical sectional view on line 8—8 in FIG. 3 illustrating the foraminous rotary metal drum or cylinder, the perforated endless conveyor belt which works around the foraminous rotary metal drum or cylinder, the first and lower and the second and upper vacuum control devices, the can feed-in conveyor, and the adjusting means for the assembly referred to in the description of FIG. 5;

FIG. 9 is a fragmentary perspective view of the foraminous rotary metal drum or cylinder and of the perforated endless conveyor belt which works therearound;

FIG. 10 is a sectional plan view on line 10—10 in FIG. 4 illustrating the rotary exhaust or vacuum fan and its housing and the air exhaust outlet duct;

FIG. 11 is a vertical view on line 11—11 in FIG. 10, of the rotary exhaust fan and its housing, the air intake duct into the fan housing, the air exhaust duct from the fan housing, and the operating motor for the rotary air exhaust fan;

FIG. 12 is a fragmentary plan view of the rotary foraminous metal drum or cylinder, and the first and lower vacuum control means or device;

FIG. 13 is an enlarged transverse sectional view of the first and lower vacuum control means or device, on line 13—13 in FIG. 12;

FIG. 14 is a sectional view on line 14—14 in FIG. 13, illustrating the first and lower vacuum control device, and the adjusting means therefor;

FIG. 15 is a central vertical sectional view illustrating the cans being delivered by the can-feeding conveyor onto the perforated endless conveyor belt and the foraminous rotary metal drum or cylinder and illustrating the removal of the cans from the perforated endless conveyor belt onto the delivery or take-away conveyor belt;

FIG. 16 is a fragmentary plan view similar to FIG. 12 but illustrating the second and upper vacuum control means or device;

FIG. 17 is an enlarged sectional view of the second and upper vacuum control means or device, on line 17—17 in FIG. 16;

FIG. 18 is an enlarged sectional detail view of the second and upper vacuum control means or device and the adjusting means therefor, on line 18—18 in FIG. 17;

FIG. 19 is a schematic diagram of the electrical circuit embodied in the invention and of the operating motors and switch control means for the operating motors;

FIG. 20 is a fragmentary perspective view illustrating the adjustable vacuum and static pressure control means for automatically adjusting and controlling the degree of vacuum and static pressure in the vacuum chamber or housing and in the air duct exhaust system in relation to the can load on the perforated endless conveyor belt and the number of holes or perforations therein which are closed by the cans as they are carried thereby over the external surface of the rotary foraminous metal drum or cylinder;

FIG. 21 is a front elevational view of the adjustable vacuum and static pressure control means illustrated in FIG. 20;

FIG. 22 is a sectional view on line 22—22 in FIG. 21;

FIG. 23 is a side perspective view of a modificaton and smaller form of the invention;

FIG. 24 is a plan view on line 24—24 in FIG. 23; and

FIG. 25 is a fragmentary perspective view of the adjustable vacuum and static pressure control means referred to in the description of FIG. 20 as applied to the modification of the invention which is illustrated in FIGS. 23, 24 and 25.

DESCRIPTION OF THE FORM OF THE INVENTION ILLUSTRATED IN FIGS. 1 TO 22, INCLUSIVE, OF THE DRAWINGS

A typical and preferred embodiment of the invention is illustrated in FIGS. 1 to 22, inclusive, of the drawings, wherein it is generally indicated at 20, and includes an upright supporting frame 21 which includes a plurality of upright supporting members, as 22, 23, 24, 25 and 26, on which an upper horizontal platform 27 is mounted.

THE AUXILIARY CAN-FEEDING CONVEYOR 110 AND THE MAIN ENDLESS CAN-FEEDING CONVEYOR 29 (FIGS. 2, 4, 5, 6, 8 AND 15)

Figure 2:
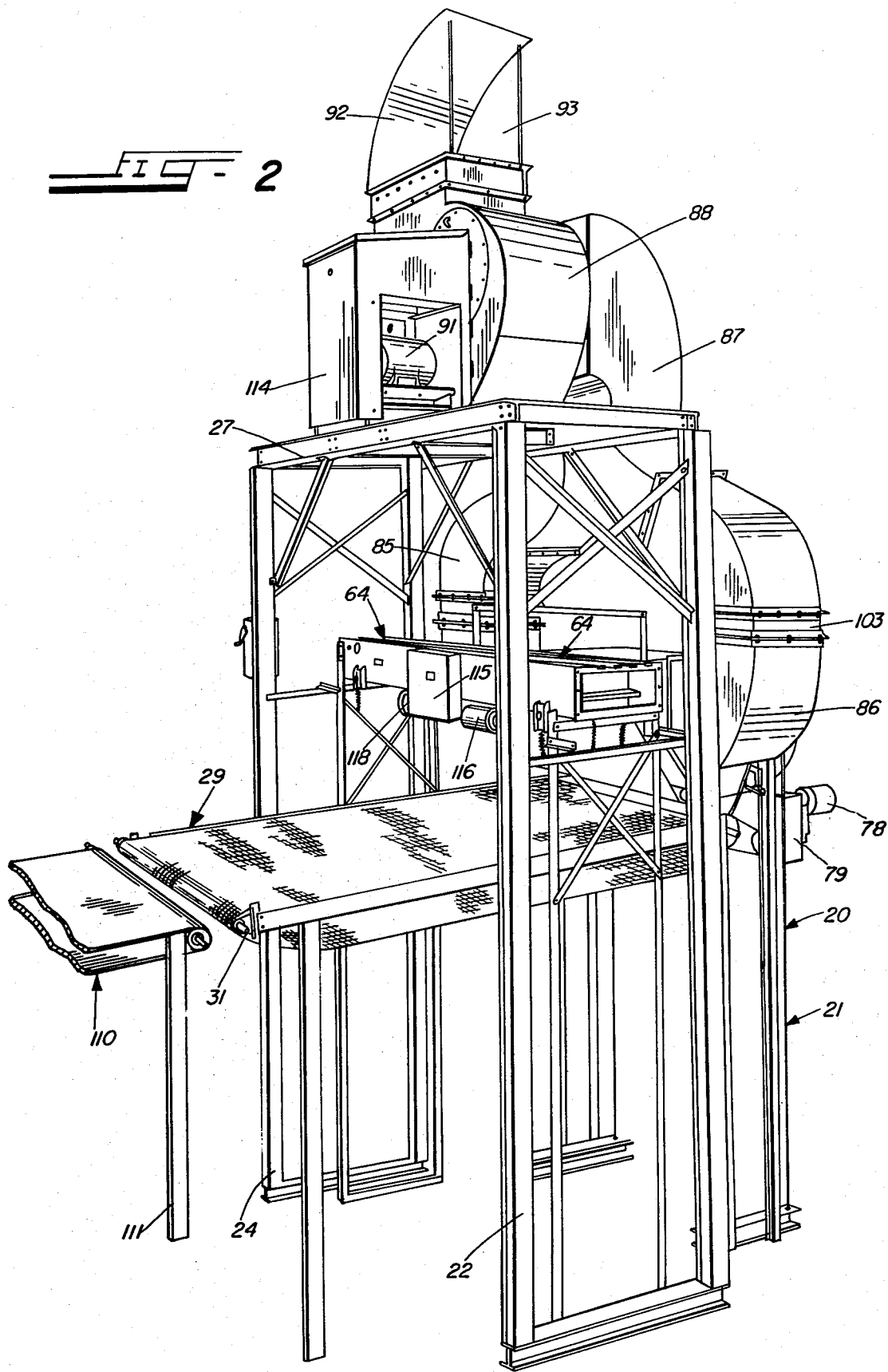
FIG. 2 is a side perspective view of the new can-conveying and can-uprighting apparatus shown in FIG. 1.

As shown in FIGS. 2 and 15, the new can-conveying and can-uprighting apparatus 20 includes an auxiliary can-feeding conveyor 110 which feeds the cans 32 in a bank of multiple rows of cans from a can washer 33 to the main endless horizontal can-feeding conveyor 29 which is suitably mounted on rollers 30 which, in turn, are mounted on horizontal shafts 31 which are suitably journaled in bearings 100 which are mounted on upright legs 34 of the supporting frame 21 (FIG. 3). As shown in FIG. 15 the auxiliary can-feeding conveyor 110 is mounted on rollers, as 123, carried by supporting shafts 28. The main can-feeding conveyor 29 is adapted to convey, on its upper run, a bank consisting of multiple rows of metal cans 32 in inverted position, that is, with the open tops thereof facing downwardly and the closed bottoms facing upwardly (FIG. 15) as they are received from the auxiliary can-feeding conveyor 110 and the can washing apparatus 33 which is of known design and construction.

THE PREFERRED FLEXIBLE ENDLESS CAN-CARRYING AND CAN-UPRIGHTING CONVEYOR 35 (FIGS. 1, 3, 4, 5, 6, 7, 8, 9 AND 15)

As best shown in FIG. 15, as the cans 32 on the upper run of the can-feeding conveyor 29 are moved to the left, as seen in FIGS. 15, the closed or bottom ends of the cans 32 face upwardly and come under and in close proximity to the bottom surface of the lower run of a perforated or air-permeable flexible plastic resinous endless can-carrying and can-uprighting conveyor belt, which is generally indicated at 35, and which includes a flexible body 36 having therein a multiplicity of holes or openings 37 (FIG. 9). This perforated endless can-carrying and can-uprighting conveyor belt 35 is guided, in part, through the downward and reverse turn of its run, around idler guide rollers 38 and 40 which are mounted on horizontal supporting shafts 42 and 44, respectively, which are suitably journaled in supporting members 46 which form part of the supporting frame (FIGS. 5 and 8). As is also shown in FIGS. 5 and 8, the flexible endless perforated conveyor belt 35 works over a tensioning roller 39 which is mounted on a supporting shaft 43 between the idler rollers 38 and 40, as will be described more fully hereinafter.

THE VACUUM CHAMBER OR HOUSING 47 (FIGS. 5, 7, 8, 12, 13, 14 AND 15)

As the cans 32 come under the lower run of the perforated endless can-carrying and can-uprighting conveyor belt 35 vacuum or suction is applied to the then upwardly extending closed bottom walls of the cans 32 from a vacuum chamber or housing 47, which is adjustably mounted on the supporting frame 21 (FIGS. 5 and 8), through a first and lower adjustable vacuum control means or device 52 which is mounted on the horizontal bottom wall 51 of the vacuum chamber or housing 47, and through holes or perforations which are formed in the bottom wall 51 of the vacuum chamber or housing 47 (FIGS. 8, 12, 13, 14 and 15).

THE FIRST AND LOWER ADJUSTABLE VACUUM CONTROL DEVICE (FIGS. 8, 12, 13, 14 AND 15)

As shown in FIGS. 8, 12, 13, 14 and 15, the first and lower adjustable vacuum control means or device 52 is mounted within the vacuum chamber or housing 47 and includes an arcuate-shaped top wall 54 which includes a fixed section 55, which is rigidly attached, as by welding, to the adjacent side wall 53 of the vacuum chamber or housing 47, and a movable and adjustable section 56 which includes a side wall portion 60 which is adjustable mounted on the adjacent side wall 53 of the vacuum chamber of housing 47 by means of adjustable fastening elements in the form of bolts 57 which are attached to the adjustable section 56 and extend through slots 58 which are formed in the side wall 53 (FIGS. 12, 13 and 14). The adjustable section 56 also includes an arcuate-shaped wall section 61.

a plurality of spaced air exhaust or suction holes or openings 59, of a predetermined size and diameter, are formed in the horizontal bottom wall 51 of the vacuum housing or chamber 47 and the adjustable section 56-60 of the first and lower vacuum control uniti 52 is manually adjustable relative to the air exhaust or suction holes or openings 59 in the bottom wall 51 of the vacuum chamber or housing 47 by means of the adjustable bolts 57 which work in the slots 58 so as to vary the number of air exhaust or suction holes or openings in the bottom wall 51 of the vacuum chamber or housing 47 which communicate, through the holes 37 in he body 36 of the perforated endless conveyor belt 35, with the upwardly disposed closed bottom walls of the cans 32 as they are carried by the feed-in conveyor belt 29 under the horizontal and bottom run of the perforated endless conveyor belt 35 (FIG. 15), as will be described more fully hereinafter.

In the use of the first and lower adjustable vacuum control means or device 52 the degree of vacuum therein and which operates through the vacuum or air exhaust holes or openings 59 in the bottom wall 57 of the vacuum chamber or housing 47, and thence through the holes or openings 37 in the perforated endless conveyor belt 35, may be adjusted so as to be sufficient to enable the perforated endless conveyor belt 35 to "grab" and hold the cans 32 as they leave the upper run of the feed-in conveyor 29, while, at the same time, the degree of vacuum thus applied is not sufficient to "grab" and hold a can which may have become tipped over or falled out of line, or otherwise misaligned relative to the other cans 32 as they leave the feed-in conveyor 29 and are "grabbed" and held by the perforated endless conveyor belt 35. Thus the degree of vacuum in the first and lower vacuum control means or device 52 may be adjusted so that it is sufficient to enable the peerforated endless conveyor belt 35 to "grab" and hold properly positioned cans 32 as they leave the upper run of the can-feeding conveyor 29 but is not sufficient to perforated grab" and hold a misaligned or tipped over can 32 which will accordingly be allowed to fall off the upper run of the can-feeding conveyor 29 at the turn-around thereof (left hand, FIG. 15). Hence, the misaligned or tipped over cans will not be "grabbed" or held by the perforated endless conveyor belt 35 and will not be carried thereby around the rotary foraminous metal drum or cylinder 62 where they would interfer with the proper alignment of the bank of multiple rows of the cans 32.

Accordingly, when the rows or banks of cans 32 approach the turn-around of the upper run of the can-feeding conveyor 29 (left hand end, FIG. 15) they come under the first and lower adjustable vacuum control means or device 52 and vacuum or suction is applied to the then upright closed bottom walls of the cans 32 through the vacuum ports or holes 59 in the horizontal bottom wall 51 of the vacuum chamber or housing 47, and through the vacuum holes or openings 37 in the body 36 of the perforated endless conveyor 35.

The vaccum or suction thus applied through the holes or perforations 37 in the body of the perforated endless flexible can-carrying and can-uprighting conveyor 35 to the then upright closed bottom ealls of the cans 32 causes the perforated endless conveyor 35 to "grab" and hold the cans 32 and carry then, from a can pick-up position at the bottom to a discharge position at the top of a generally cylindrical air-permeable foraminous or expanded metal rotary drum or cylinder which is generally indicated at 62, and which will be described hereinafter.

In this manner the cans 32 are carried by the perforated endless conveyor 35, in cooperation with the foraminous metal drum or cylinder 62, through an arc of approximately 180° so that when they reach the upper run of the perforated endless can-carrying and can-uprighting conveyor 35, they have been uprighted, that is, as shown in FIG. 15, the cans 32 have been turned through 180° and the closed bottom walls thereof then face downwardly on the upper run of the perforated endless conveyor 35 and the open tops thereof are disposed upwardly.

THE SECOND AND UPPER ADJUSTABLE VACUUM CONTROL DEVICE 63 (FIGS 8, 15, 16, 17 AND 18)

The new vacuum operated can-carrying and can-uprighting apparatus 20 includes a second and upper vacuum control device, which is generally indicated at 63, which is mounted within the vacuum chamber or housing 47, and is illustrated in FIGS. 8, 15, 16, 17 and 18 of the drawings. The second and upper vacuum control device 63 is substantially similar in construction to the first and lower vacuum control device 52 and hence those parts thereof which are similar to corresponding parts in the first and lower vacuum control device 52 have been given the same reference numerals followed by the additional and distinguishing reference character "a".

However, in the second and upper vacuum control device 63 the parts are inverted relative to the positions of the corresponding parts in the first and lower vacuum control device 52 with the stationary section 55a thereof being rigidly attached, as by welding, to the adjacent side wall 53 of the vacuum chamber or housing 47 and the adjustable section 56a being adjustably mounted on the side wall 53 of the vacuum chamber or housing 47 by means of bolts 57a and slots 58a so as to control the number of vacuum or suction holes or openings 59a in the horizontal top wall 48 of the vacuum chamber or housing 47 through which vacuum or suction may be applied to the bottom walls of the then uprighted cans 32 as they are carried by the perforated endless conveyor belt 35 away from the foraminous rotary metal drum or cylinder 62 toward, and are deposited on, a delivery or take-away conveyor 62 (FIG. 15). In this manner, the degree of vacuum or suction applied to the bottom walls of the then uprighted cans 32 may be gradually reduced and adjusted to allow the uprighted cans 32 to be carried along the perforated endless conveyor belt 35 to the delivery or take-away conveyor 64 wihtout being held by vacuum or jamming on the perforated endless conveyor belt 35.

THE FORAMINOUS METAL CAN-CARRYING AND CAN-UPRIGHTING DRUM OR CYLINDER 62 (FIGS. 1, 3, 4, 5, 6, 7, 8, 9 AND 15)

As shown in FIGS. 1, 3, 4, 5, 6, 7, 8, 9 and 15, the new can-conveying and can-uprighting apparatus 20 includes a generally cylindrical rotary air-permeable member in the form of an air-permeable rotary foraminous or expanded metal can-carrying and can-uprighting drum or cylinder 62, which has a hollow internal area, and which includes a pair of end discs 122 and a plurality of annular spoked intermediate supporting discs 65 which are mounted in parallel horizontally spaced relationship on a horizontal supporting shaft 66, the end portions of the shaft 66 being rotatably journaled in bearings 68 which are attached, as at 69, to walls, as 70, of the supporting frame 21 (FIG. 6).

As shown in FIG. 9, the outer or peripheral surface of the foraminous can-carrying and can-uprighting rotary metal drum or cylinder 62 consists of a body 71 of expanded metal which surrounds and is attached, in any suitable manner, to the end discs 122 and the intermediate supporting discs 65. As is also shown in FIG. 9, the body 36 of the perforated endless can-carrying and can-uprighting endless conveyor belt 35 extends around and encircles approximately 180° of the peripheral surface of the foraminous metal body 71 of the rotary drum or cylinder 62 on the outer side thereof.

As shown in FIGS. 8 and 15, the body of the rotary foraminous metal drum or cylinder 62 projects radially into and works within the interior of the vacuum chamber or housing 47 and projects into the vacuum chamber or housing 47 between a point 126 in the horizontal bottom wall 51 and a point 127 in the horizontal top wall 48 of the vacuum chamber or housing 47.

In this manner, the cylindrical peripheral surface of the foraminous rotary metal drum cylinder 62-71 and the outer surface of the perforated flexible can-carrying endless conveyor belt 35 which works thereover, have communication with the interior of the rotary metal drum or cylinder 62-71 and with the vacuum chamber or housing 47 between the vacuum start-up or "grab" point, at the first and lower vacuum control device 52, and the vacuum cut-off point at the second and upper vacuum control device 63 (FIG. 15) as the rotary foraminous metal drum or cylinder 62-71 moves the perforated flexible endless can-carrying and can-uprighting conveyor belt 35 therearound between the vacuum start-up or "grab" point and the vacuum cut-off point (FIG. 15)

Figure 1:
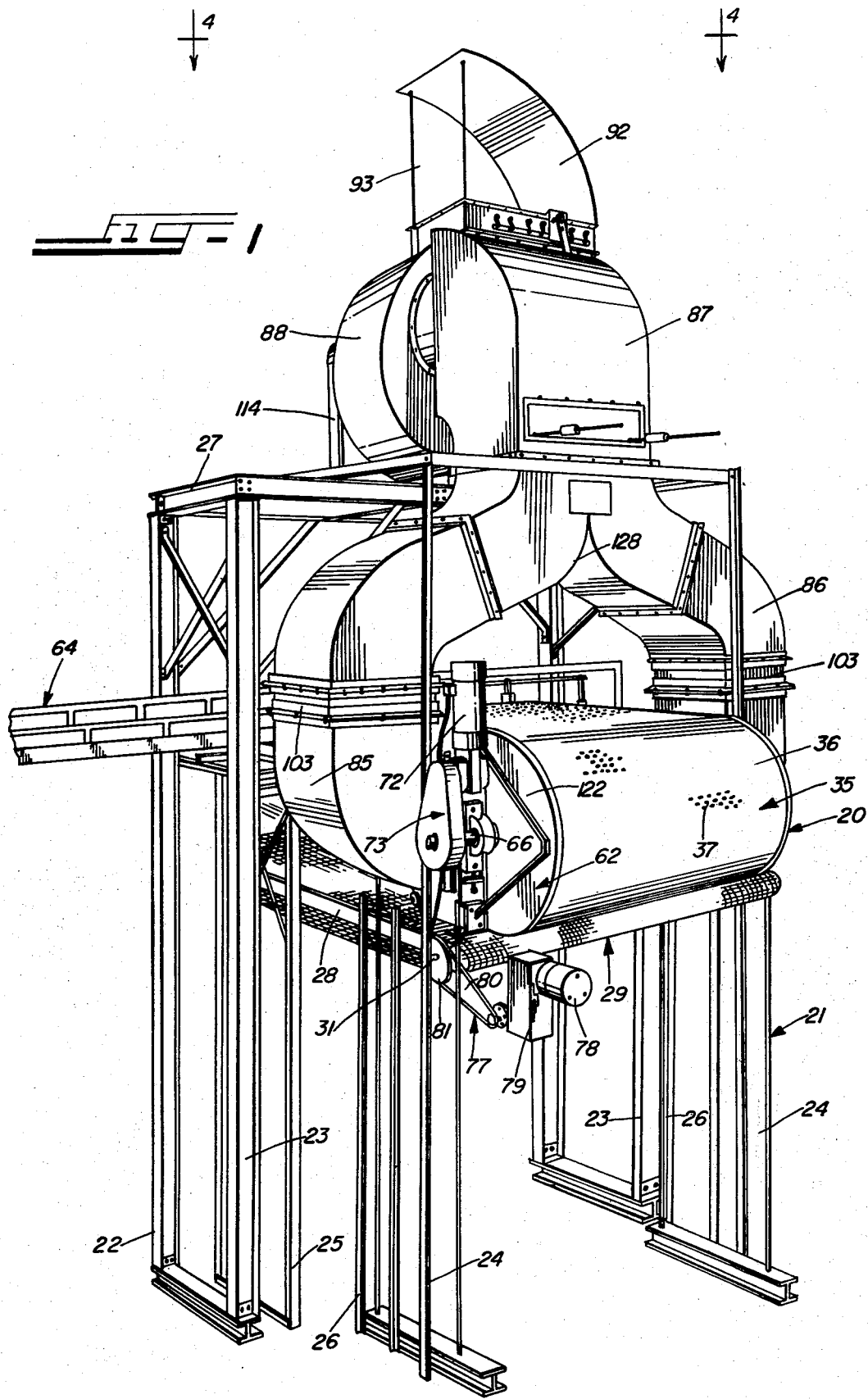
FIG. 1 is a rear perspective view of a preferred and typical embodiment of the invention.

THE DRIVING MEANS FOR THE ROTARY FORAMINOUS METAL DRUM OR CYLINDER 62-71 AND FOR THE PERFORATED ENDLESS CONVEYOR BELT 35 (FIGS. 1, 6 AND 19)

The foraminous metal drum or cylinder 62-71 and the perforated endless conveyor belt 35 which works therearound are driven by a suitable electric motor 72 and driving unit 73 of conventional design and which is mounted on the supporting frame 21 and is operatively connected to the adjacent end portion of the supporting shaft 66 for the foraminous rotary metal drum or cylinder 62–71 (FIG. 1). As shown schematically in FIG. 19, the operating electric motor 72 for the driving unit 73 for the rotary foraminous metal drum or cylinder 62-71 is under control of a manually operable switch control unit 74 which is arranged in an electrical circuit 75 which is connected to a suitable source of electric power.

THE DRIVING MEANS FOR THE CAN-FEEDING CONVEYOR 29 (FIG. 1)

The driving means for the can-feeding conveyor 29 is illustrated in FIG. 1, wherein it is generally indicated at 77, and includes an electric motor unit 78 and a driving mechanism 79 which includes a belt 80 which works around a driven pulley 81 which is mounted on one end portion of the supporting shaft 31 (FIG. 1). The electric motor unit 78 for the driving mechanism 79 is under control of a manually operable switch control unit 82 which is arranged in the operating circuit 75 (FIG. 19).

THE VACUUM OR AIR DUCT EXHAUST SYSTEM FOR THE VACUUM CHAMBER OR HOUSING 47 AND THE VACUUM FAN AND DRIVING MEANS THEREFOR (FIGS. 1, 2, 3, 4, 10 AND 11)

The vacuum chamber or housing 47 has opposite open end portions 83 and 84 which are connected to an air duct exhaust system which includes vacuum ducts 85 and 86, respectively, (FIG. 7), which are made of any suitable material, such as sheet metal, and are suitably mounted on the supporting frame 21 at opposite sides of the vacuum chamber or housing 47. The two vacuum ducts 85 and 86 extend upwardly from the vacuum chamber or housing 47 and inwardly toward each other and are merged together, as at 128 (FIGS 1 and 3) into a single common or junction duct 87 which leads into and communicates with a fan housing 88. A high speed rotary air exhaust fan 89 is rotatably mounted on a shaft 90 in the fan housing 88 and is driven by a high speed electric motor unit 91 which is mounted in a motor housing 114 which, in turn, is mounted on the top wall portion 27 of the supporting frame 21 (FIGS. 1 and 2).

As shown in FIGS. 1, 2, 3, 4, 10 and 11, a curved baffle or hood 92 is mounted on the top wall of the fan housing 88, in communication therewith, and has an air exhaust outlet 93 formed therein through which air is exhausted to the atmosphere as the high speed rotary fan exhaust 89 exhausts air from the vacuum chamber or housing 47, through the air exhaust or suction ducts 85-86-87, to create the desired degree of vacuum or static pressure in the vacuum chamber or housing 47 and through the holes or openings 59 and 59a in the bottom wall 59 and in the top wall 59a of the vacuum chamber or housing 47, and in the foraminous rotary metal drum or cylinder 62 and through the holes or openings 37 in the body 36 of the flexible perforated endless can-carrying and can-uprighting conveyor 35.

As shown in FIG. 19, the high speed electric operating motor 91 for the high speed exhaust fan 89 is arranged in the operating circuit 75 under control of a manually operable switch control unit 95.

THE ADJUSTING MEANS FOR THE VACUUM CHAMBER OR HOUSING 47, THE ROTARY FORAMINOUS METAL DRUM OR CYLINDER 62 AND THE PERFORATED ENDLESS CONVEYOR BELT 35 (FIGS. 5, 6 AND 8)

The new can-conveying and can-uprighting apparatus 20 includes adjusting means, generally indicated at 96 (FIGS. 5, 6 and 8), for vertically adjusting the height of the vacuum chamber or housing 47, the rotary foraminous metal drum or cylinder 62, the perforated vacuum conveyor belt 35, the vaccm chamber or housing 47, and the vacuum or air exhaust 85-86-87, as a unit or assembly, relative to the can-feeding conveyor 29 so as to accommodate the new can-conveying and can-uprighting apparatus to cans of various and different sizes and heights. This adjusting means 96 includes a first pair of adjusting screw members 97 (FIGS. 5 and 6) the lower end portions of which are attached, as at 98, to supporting members 99 which are mounted on the supporting frame 21 and on which bearings 100 for the end portions of the supporting shaft 31 are mounted. The upper end portions of the adjusting screws 97 are adjustably mounted, as at 101, in brackets 102 which are attached, as at 124, to one end wall 104 of the vacuum chamber or housing 47 (FIGS. 5 and 6).

The adjusting means 96 also includes a second pair of adjusting screw members 97a the lower end portions of which are mounted by nuts, as 98a, in brackets 99a which are attached to the supporting frame 21. The upper end portions of the adjusting screw members 97a are adjustably mounted by nuts 101a in brackets 102a which are attached to the bottom wall 51 of the vacuum chamber or housing 47 (FIGS. 5 and 8).

As shown in FIGS. 1, 2, 3, and 5, each of the vacuum or air exhaust ducts 85 and 86 has an accordion-fold flexible section 103 embodied therein to enable the entire assembly of the vacuum chamber or housing 47, the rotary foraminous metal drum or cylinder 62, the perforated endless conveyor belt 35, and the vacuum or air exhaust ducts 85 and 86 to be adjusted vertically relative to the upper horizontal run of the can-feeding conveyor 29.

The adjusting means 96 thus enables the entire assembly of the vacuum chamber or housing 47, the rotary foraminous metal drum or cylinder 62, the perforated endless conveyor belt 35 and the vacuum ducts 85-86 to be adjusted vertically relative to the horizontal upper run of he can-feeding conveyor 29 so as to vary the predetermined vertical distance or space between the upper horizontal run of the can-feeding conveyor 29 and the bottom horizontal run of the perforated can-carrying and can-uprighting endless conveyor belt 35, as shown in FIGS. 5, 6 and 8, so as to accommodate the new can-conveying and can-uprighting apparatus 20 to cans of varying and different heights and sizes. This adjustment is readily manually effected by manipulating the adjustment screws 97 and 97a in a relative to the nuts 98-101 and 98a -101a so as to raise or lower the brackets 102 and 102a relative to the stationary brackets 99 and 99a, and relative to the supporting frame 21, thereby raising or lowering the entire assembly of the vacuum chamber or housing 47, the rotary foraminous metal drum or cylinder 62, the perforated endless conveyor belt 35, and the vacuum or air exhaust ducts 85 and 86 relative to the horizontal upper run of the can-feeding conveyor 29. During this operation the accordion-fold sections 103 of the vacuum or air exhaust ducts 85 and 86 are contracted or expanded depending upon whether the vacuum or exhaust ducts 85 and 86 are raised or lowered.

THE TENSIONING DEVICE FOR THE PERFORATED ENDLESS CONVEYOR BELT 35 (FIG. 5)

The new can-conveying and can-uprighting apparatus 20 includes a tensioning device, generally indicated at 106 (FIG. 5) for tensioning the perforated endless conveyor belt 35. The tensioning device 106 is associated with the tensioning roller 39 and the idler rollers 38 and 40 and includes a first supporting member 107 which is rigidly attached to the supporting frame member 46 and has the idler roller 40 and supporting shaft 44 attached thereto below the perforated endless conveyor belt 35, as shown in FIG. 5. the tensioning device 106 also includes a second supporting member 108 which is rigidly attached to the supporting frame member 46 and has the idler roller 39 and its supporting shaft 43 mounted thereon. The tensioning device 106 also includes a manually operable adjusting screw 109 which is adjustably mounted in the supporting member 108 for adjusting the tensioning roller 39 and its supporting shaft 43 on and relative to the supporting member 103 so as to vary and control the tension of the perforated endless conveyor belt 35.

THE AUXILIARY CAN-FEEDING CONVEYOR 110 (FIGS 2 AND 15)

The new can-conveying and can-uprighting apparatus 20 includes an auxiliary can-feeding conveyor, which is generally indicated at 110, and which is suitably mounted on a supporting frame unit 111, at the intake end of the can-feeding conveyor 29 and by means of which a bank of multiple rows of cans, as 32, may be conveyed from the can washer, as 33, onto the main can conveyor 29 (FIGS 2 and 15). The auxiliary can-feeding conveyor 110 is mounted on and works over rollers 123 which are mounted on and journaled on the supporting frame 21.

THE DELIVERY OR TAKE-AWAY CONVEYORS 64 AND 112 (FIGS. 1, 2, 3, 4, 5 AND 15)

The form of the new can-conveying and can-uprighting apparatus 20, as shown in FIGS. 1 to 22, inclusive, includes a first pair of delivery or take-away conveyors 64 (FIGS. 1, 2, 3, 4, 5 and 15) which are arranged at the delivery or output end of the perforated endless conveyor belt 35 and movable in opposite directions and are so disposed that the intake ends of the delivery or take-away conveyors 64 are positioned centrally of the perforated endless conveyor belt 35 at the output end of the latter so that a part of the output of the upright cans 32 from the perforated endless conveyor belt 35 is divided and is discharged onto each of the two delivery or take-away conveyors 64 which, in turn, discharge the uprighted cans 32 onto a pair of second and auxiliary take-away conveyors 112 (FIGS. 3) by which the uprighted cans 32 are conveyed to printing and labeling apparatus, or other work station. This arrangement provides for high speed operation and volume production as compared to the use of a single unidirectional delivery or take-away conveyor reduces the danger of jamming of the uprighted cans 32 as they are delivered by the perforated endless conveyor belt 35 onto the delivery or take-away conveyors 64 and 112.

As shown in FIG. 3, the endless delivery or take-away conveyors 64 are suitably mounted, as at 125 and 129, on the supporting frame 21 and are driven by operating mechanisms, generally indicated at 115, and which are driven by electric motor units 116 and 118 which are arranged in the electrical operating circuit 75 and are under the control of manually operable switch control units 117 and 119, respectively (FIG. 19).

THE ADJUSTABLE VACUUM AND STATIC PRESSURE CONTROL DEVICE FOR AUTOMATICALLY ADJUSTING AND CONTROLLING THE DEGREE OF VACUUM AND STATIC PRESSURE IN THE VACUUM CHAMBER OR HOUSING AND IN THE AIR DUCT EXHAUST SYSTEM IN RELATION TO THE CAN LOAD ON THE PERFORATED CONVEYOR BELT (FIGS. 1, 20, 21 AND 22)

The present invention includes means for automatically adjusting and controlling the degree of vacuum or static pressure in the vacuum chamber or housing and in the air duct exhaust system in relation to the can load on the perforated conveyor belt 35 as determined by the number of holes or openings in the perforated conveyor belt 35 which are closed by the cans 32 held thereby as they are carried over the external surface of the rotary foraminous metal drum or cylinder. This means is illustrated in FIGS. 1, 20, 21 and 22, wherein it is generally indicated at 130 and is associated with the air duct exhaust system 85-86-87.

To this end the wall 131 of the vacuum junction duct 87 has a generally rectangular-shaped opening 132 formed therein in which a movable vacuum and static pressure control member in the form of a closure member or door 133 is mounted interiorly of the wall 131 of the junction duct 87 and has a lower end portion 134 which is hingedly attached, as at 135, to the upper leaf of each of a pair of laterally spaced hinge members 136, the lower leaves 137 of which are attached, as at 138, to the wall 131 of the junction duct 87 (FIG. 21 and 22).

An angle iron reenforcement 139 is attached to the wall 131 of the junction duct 87 around the marginal edge of the door opening 132, and on the inner side thereof, and a flexible resilient member in the form of a strip or pad of an air and water-resistant material 140, or like flexible resilient sealing material, adhesively attached to the angle iron reenforcement 139.

A pair of elongated counterbalance supporting rod members 141 are attached to and are movable with the vacuum and static pressure control and closure door member 133 and project outwardly therefrom exteriorly of the closure door 133 and exteriorly of the wall 131 of the junction duct 87. Thus, it will be noted that each of the counterbalance supporting rods 141 has an inner end portion 145 which is attached, as at 147, as by welding, to the inner surface of the lower end portion of the closure door 131, and the inner end portion 145 or each counterbalance supporting rod 141 is also attached, as at 148, as by welding, to an angle iron supporting member 149 which is attached, as by welding, to the inner surface of the lower end portion of the closure door 133.

A counterbalance member in the form of a cylindrical metal counterbalance weight 142 is adjustably mounted on each of the counterbalance-supporting rods 141, outwardly of the closure door 133, and each of the counterbalance weight members 142 is adjustably and slidably mounted on its supporting rod member 141 by means of spacing collars 143 which are adjustably mounted on the supporting rod members 141 and each of which may be suitably positioned therein by means of a set screw 144 which is adjustably mounted in each of the spacing collars 143 and is engageable with the corresponding one of the counterbalance supporting rod members 141.

In the use of the present invention, the vacuum and static pressure control and closure door 133 is urged into closed position on its hinge members 136-137 by the counterweights 142 on the supporting rods 141. However, as a load of cans 32 is picked up by the perforated conveyor belt 35 and are carried thereby around a part of the peripheral surface of the rotary foraminous metal drum or cylinder 62, thus closing a corresponding perforated area of the perforated conveyor belt 35, as determined by the number of holes or perforations 37 thus closed in the body 36 of the perforated conveyor belt 35, the degree of vacuum or static pressure in the vacuum chamber or housing 47, and in the air exhaust duct system 85-86-87, is increased in relation to the can load on the perforated conveyor belt 35 and the number of holes or perforations 37 therein which are closed by the cans 32. The vacuum and static pressure control and closure door 133 is then urged, by the external atmospheric air pressure, into open position on its hinge mountings 136-137, against the action of the counterweights 142 and the extent to which the vacuum or static pressure control and closure door 133 is thus opened depends upon and is directly related to the can load on the perforated conveyor belt 35 and the total closed perforated area of the perforated conveyor belt 35 as determined by the number of holes or perforations 37 therein which are closed by the cans 32 carried by the perforated conveyor belt 35.

Thus, during operation of the new can-conveying and canuprighting apparatus 20 the vacuum and static pressure control and closure door 133 continues to open and close in direct relation to the total closed perforated area represented by the number of holes or perforations 37 in the perforated conveyor belt 35 which are closed by the corresponding number of cans 32 which are being carried by the perforated conveyor belt 35 over the rotary foraminous metal drum or cylinder 62. In this manner, the proper degree of vacuum or static pressure in the vacuum chamber or housing 47 and in the air duct exhaust system 85-86-87, in relation to the can load carried by the perforated conveyor belt 35 over the foraminous metal drum or cylinder 62, is maintained during operation of the can-conveying and can-uprighting apparatus 20. This assures that the load of cans 32 on the perforated conveyor belt 35 will be properly held thereon as the cans 32 are carried thereby over the rotary foraminous metal drum or cylinder 62, and assures that the proper degree of vacuum or static pressure on the face of the perforated conveyor belt 35 will be maintained, as discussed hereinafter, and further assures that any damage to the can-conveying and can-uprighting apparatus 20, which might be caused by the formation of an excessive degree of vacuum or static pressure in the vacuum chamber or housing 47, and in the air duct exhaust system 85-86-87, and on the face of the perforated conveyor belt 35, is avoided.

SUMMARY OF OPERATION OF THE FORM OF THE INVENTION ILLUSTRATED IN FIGS. 1 TO 22, INCLUSIVE

In the use and operation of the new vacuum operated can-conveying and can-uprighting apparatus embodying the form of the invention illustrated in FIGS. 1 to 22, inclusive, a bank of multiple rows of cans 32 are fed from the can washer 33 onto the auxiliary can-feeding conveyor 110 (FIGS. 2 and 15) and thence onto the upper run of the main can-feeding conveyor 29, in inverted position, that is, with the open tops of the cans 32 facing downwardly and the closed bottom walls thereof facing upwardly, so that the cans 32 are positioned as shown in FIG. 15. Thus, as the cans 32 are advanced by the upper horizontal run of the can-feeding conveyor 29 they come under and in closed proximity to the bottom surface of the lower horizontal run of the perforated endless conveyor belt 35, and as they are advanced between the can-feeding conveyor 29 and the perforated endless conveyor belt 35, they come under the first and lower vacuum control device 52 and below the perforated horizontal bottom wall 51 of the vacuum chamber or housing 47. Hence, as the cans 32 reach the initial or "grab" point, that is, as they leave the upper horizontal run of the can-feeding conveyor 29, a controlled degree of vacuum or suction is applied from the first and lower vacuum control device 52 through the holes or perforations 59 in the horizontal bottom wall of the vacuum chamber or housing 47 through the perforations 37 in the body 36 of the perforated endless conveyor belt 35 to the then upwardly disposed closed bottom walls of the cans 32, thereby causing the cans to be "grabbed" by and to adhere to the perforated endless conveyor belt 35 as the cans leave the upper horizontal run of the can-feeding conveyor 29 and are carried by the perforated endless conveyor belt 35 toward and around the foraminous metal drum or cylinder 62, in a clockwise direction as shown in FIGS. 8 and 15.

During this operation the cans 32 are carried by the perforated can-carrying and can-uprighting endless conveyor belt 35 and the foraminous metal drum or cylinder 62 through an arc of approximately 180° and are thus uprighted so that as the cans 32 are carried by the perforated endless conveyor belt 35 away from the rotary foraminous metal drum or cylinder 62 they are in upright position with the open tops thereof facing upwardly and the closed bottom walls thereof facing downwardly.

As the thus uprighted cans 32 are carried by the perforated endless conveyor belt away from the rotary foraminous metal drum or cylinder 62, they pass over the second and upper vacuum control device 63 by which the vacuum from the vacuum chamber or housing 47 through the second and upper vacuum control device 63 is reduced as the upright cans 32 travel tangentially away from the foraminous metal drum or cylinder 62 onto the upper horizontal run of the perforated endless conveyor belt 35. This arrangement of the second and upper vacuum control device 63 provides for a controlled and reduced degree of vacuum being applied to the uprighted cans 32 and assures that the uprighted cans 32 will not become jammed and will not fall off the perforated endless conveyor belt 35 as they are carried thereby away from the rotary foraminous metal drum or cylinder 62 while, at the same time, the same high degree of vacuum or static pressure which is required to carry the cans 32 on the perforated endless conveyor belt 35 around the rotary foraminous metal drum or cylinder 62 is not required as the uprighted cans 32 are carried by the perforated endless conveyor belt 35 away from the rotary foraminous metal drum or cylinder 62.

The output of the bank of multiple rows of the uprighted cans 32 thus carried by the upper horizontal run of the perforated endless conveyor belt 35 is delivered or discharged in part onto each of the oppositely moving delivery or take-away conveyors 64 by which they are discharged onto the second delivery or take-away conveyors 112 by which they may be carried to the printing or labeling apparatus (not shown), or other work station.

During the operation thus described, vacuum or suction is applied by the high speed motor driven rotary air exhaust fan 89 in the fan housing 88, through the vacuum duct junction 87, to the vacuum ducts 85 and 86, at opposite ends of the vacuum chamber or housing 47, to exhaust the air from the vacuum chamber or housing 47 and thereby create a controlled degree of vacuum, suction or static pressure in the vacuum chamber or housing 47 which is sufficient to "grab" and hold the cans on the perforated endless conveyor belt 35, as they are carried thereby around the foraminous metal drum or cylinder 62. During this operation the lower vacuum control device 52 may be adjusted so hat the degree of vacuum or static pressure applied therethrough and through the perforations 59 in the bottom horizontal wall 51 of the vacuum chamber or housing 47 and through the holes or perforations 37 in the body 36 of the perforated endless conveyor belt 35 onto the then upright closed bottom walls of the cans 32 is adequate and sufficient to "grab" and hold the cans 32 on the perforated endless conveyor belt 35 as they reach the turn-around of the upper horizontal run of the can-feeding conveyor 29, and the vacuum applied through the foraminous metal drum of cylinder and through the holes 37 in the body 36 of the perforated endless conveyor belt 35 holds the cans 32 on the periphery of the perforated endless can-carrying and can-uprighting conveyor conveyor belt 35 as the cans are carried thereby around the rotary foraminous metal drum or cylinder 62.

As the cans 32 are thus carried by the perforated endless conveyor belt 35 around the foraminous metal drum or cylinder 62 vacuum is applied from the vacuum chamber or housing 47 through the opening or interstices 71 in the rotary foraminous metal drum of cylinder 62 and thence through the holes or openings 37 in the body 36 of the perforated endless conveyor belt 35 to the bottom walls of the cans 32 to hold the cans 32 on the perforated endless conveyor belt 35 and on the rotary foraminous metal drum or cylinder 62 so that the cans 32 are thus carried through approximately 180° of arc and are uprighted and discharged from the perforated endless conveyor belt 35 onto the two oppositely moving delivery or take-away conveyors 64 and thence onto the auxiliary delivery or take-away conveyors 112 by which they may be delivered to the printing and labeling apparatus, or to other work station.

As the thus uprighted cans 32 are carried by the perforated endless conveyor belt 35 away from the foraminous metal drum or cylinder 62, they travel over the second and upper vacuum baffle control device 63 by which the degree of vacuum or static pressure applied to the then downwardly disposed bottom walls of the cans 32 is controlled and is reduced and the vacuum applied to the bottom walls of the cans 32 is entirely cut off as the uprighted cans 32 are carried by the perforated endless conveyor belt 35 away from the second and upper vacuum control unit 63 (FIG. 15).

As set forth herein before, during operation of the can-conveying and can-uprighting apparatus 20, the proper degree of vacuum or static pressure in the vacuum chamber or housing 47 and in the air duct exhaust system 85-86-87 in relation to the can load on the perforated endless conveyor belt 35-36-37, and the corresponding perforated area of the perforated endless conveyor belt 35, as determined by the number of holes or perforations therein which are closed by the cans 32 as they are carried thereby over the rotary foraminous metal drum or cylinder 62, is maintained by the adjustable vacuum or static pressure control device 130 which is normally urged into closed position by the counterweights 142 but automatically opens and closes, under the influence of the external atmospheric air pressure, in direct relation to the total perforated area of the perforated conveyor belt 35 as determined by the number of holes or perforations 37 in the body 36 of the perforated conveyor belt 35 which are closed by the cans 32 carried thereby over the rotary foraminous metal drum or cylinder 62.

It has been found in the use of the new can-conveying and can-uprighting apparatus that it provides for relatively rapid handling of cans in transferring them from a can washing apparatus to a can printing and labeling apparatus, or other work station, in multiple rows or banks of cans and without damage or injury to the metal bodies of the cans caused by bumping of the cans together with resulting denting and scuffling as has been experienced in the use of the prior overhead and single file can-conveying and can-uprighting apparatus, so that in the use of the new can-conveying and can-uprighting apparatus the cans 32 are delivered to the printing and labeling apparatus without denting or scuffing or other damage or injury which causes problems and difficulties in the printing and labeling of the cans, as experienced heretofore in the art.

It will also be noted that the adjusting means 96-97-98-99-100-101-102 and 96a-97a-98a-99a-100a-101a-102a for the assembly of the vacuum chamber or housing 47, the rotary foraminous metal drum or cylinder 62, the perforated endless conveyor belt 35, and the vacuum ducts 85 and 86 enables the new can-conveying and can-uprighting apparatus to be adjusted for use with cans of various heights and sizes which may be carried by the upper horizontal run of the can-feeding conveyor 29 into position to be "grabbed" and hold by the lower horizontal run of the perforated endless conveyor belt 35, for handling in the manner described above, and as illustrated in FIG. 15.

THE MODIFICATION OF THE INVENTION ILLUSTRATED IN FIGS. 23, 24 AND 25

A modification of the invention is illustrated in FIGS. 23, 24 and 25 of the drawings, and those parts thereof which are similar to or correspond to parts in the form of the invention illustrated in FIGS. 1 to 22, inclusive, have been given the same reference numerals followed by the additional and distinguishing reference character "b".

The form of the invention illustrated in FIGS. 23, 24 and 25 is substantially similar to that shown in FIGS. 1 to 22, inclusive, except that it is a smaller unit of less capacity than the form of the invention illustrated in FIGS. 1 to 22, inclusive, and embodies a smaller size foraminous rotary metal drum or cylinder 62b which may be in the order of seventy-six (76) inches in width and thirty (30) inches in diameter.

In addition, the smaller form of the invention illustrated in FIGS. 23, 24 and 25 embodies a single and unidirectional delivery or take-way conveyor 113 for conveying the entire output of the uprighted cans from the perforated endless conveyor belt 35b to the printing and labeling apparatus, or other work station.

As shown in FIG. 25, the modification and smaller form of the invention illustrated in FIGS. 23, 24 and 25, embodies an adjustable vacuum or static pressure control device 130a which is substantially similar to the adjustable vacuum or static pressure control device 130 which is embodied in the form of the invention illustrated in FIGS. 1 to 22, inclusive, except that in this modification of the invention the adjustable vacuum or static pressure control device 130a embodies a single counterbalance weight 142a and a single supporting rod 141a therefor.

ADDITIONAL STRUCTURAL AND OPERATING CHARACTERISTICS OF THE NEW CAN-CONVEYING AND CAN-UPRIGHTING APPARATUS AS SHOWN IN FIGS. 1 TO 22, INCLUSIVE, AND IN FIGS. 23, 24 AND 25

THE ROTARY FORAMINOUS METAL DRUM OR CYLINDER 62 AND THE PERFORATED ENDLESS CONVEYOR BELT 35 AND THE DEGREE OF VACUUM OR STATIC PRESSURE APPLIED THERETO

Typical dimensions of the foraminous metal drum or cylinder 62 as employed in the embodiment of the invention which is illustrated in FIGS. 1 to 22, inclusive, are as follows:

Diameter — 42 inches
Width — 76 inches

For a smaller form of the invention, as in the modification illustrated in FIGS. 23, 24 and 25, typical dimensions of the rotary foraminous metal drum or cylinder 62b are as follows:

Diameter — 30 inches
Width — 76 inches

However, the dimensions of the foraminous or expanded metal rotary drum or cylinder 62b and the related correspondng width of the perforated flexible endless can-carrying and can-uprighting conveyor belt 35 depend upon the size and weight of the cans to be handled thereby.

Similarly, the degree of vacuum, as measured in terms of static pressure, applied to the cans 32, depends upon the dimensions of the foraminous rotary metal drum or cylinder 62 or 62b and the size and weight of the cans to be handled thereby. However, the following are typical of the degree of vacuum or static pressure to be applied to the rotary foraminous metal drum or cylinder 62 or 62b for use with typical cans:

For the 42 inch by 76 inch drum or cylinder — 2.5 inches of static pressure

For the 30 inch by 76 inch drum or cylinder — 3 inches of static pressure

However, the degree of vacuum in terms of inches of static pressure required and applied from the vacuum chamber or housing 47 to the perforated endless can-carrying and can-uprighting conveyor belt 35 is less at the can pick-up or "grab" point where the cans 32 are "grabbed" by the perforated endless conveyor belt 35, and at the vacuum cut-off or release point where the cans 32 pass over the second and upper vacuum control device 63, than the degree of vacuum which is necessary for and is applied to the fully loaded perforated endless conveyor belt 35 and the rotary foraminous metal drum or cylinder 62 as they move in fully loaded position between the vacuum pick-up or "grab" point and the vacuum release position or point.

Thus, the degree of vacuum required and applied at the vacuum pick-up point of "grab" point, through the first and lower vacuum control device 52 and the degree of vacuum required and applied at the vacuum release point, that is, at the second and upper vacuum control unit 63, may vary from one-half (½) to three-fourths (¾) of the degree of vacuum or static pressure required and applied to the rotary foraminous metal drum or cylinder 62 and to the perforated endless conveyor belt 35 in their fully loaded position as they travel between the vacuum pick-up or "grab" position and the vacuum release or discharge point. In the case of the larger or 42 × 76 inch rotary formainous metal drum or cylinder 62 a typical degree of vacuum required to hold a full load consisting of a bank of multiple rows of cans 32 on the rotary foraminous metal drum or cylinder 62 and on that portion of the perforated endless conveyor belt 35 which travels thereover, is 2.5 inches of static pressure, whereas the degree of vacuum required at the vacuum pick-up or "grab" point and at the vacuum release point is 1.75 inches of static pressure for aluminum cans two and five-eighths (2-⅝) inches in diameter and four and seven-eights (4-⅞) inches in height, and corresponding or comparable degrees of statis pressure for metal cans of other sizes and weights.

In the use of the new can-conveying and can-uprighting apparatus this adjustment in the degree of vacuum or static pressure at the vacuum pick-up or "grab" position and at the vacuum release position may be adjusted to the requirements of the dimensions of the rotary foraminous metal drum or cylinder 62 or 62b and the area of the perforated endless conveyor belt 35 or 35b traveling thereover, by adjustment of the first or lower vacuum control unit 52 and the second or upper vacuum control unit 63.

THE PERFORATED CONVEYOR BELT 35

The perforated body 36 of the can-carrying and can-uprighting conveyor belt 35 is preferably composed of a polyester resin having a polyurethane outer coating approximately 3/32 inch thick, and a typical diameter for the holes or perforations 37 therein is three-sixteenths (3/6 inch) of an inch. The total surface area encompassed by the holes or perforations 37 in the body 36 of the perforated endless conveyor belt 35, as provided by the holes or perforations 37 therein, is approximately fifteen (15%) percent of the total surface of the perforated endless conveyor belt 35.

However, the total open area of the peripheral surface of the rotary foraminous metal drum or cylinder 62, as provided by the openings or interstices in the expanded metal body 71 thereof, is preferably in the order of seventy (70%) percent, with approximately thirty (30%) percent of the peripheral surface of the rotary foraminous metal drum or cylinder 62 being closed by the expanded metal 71 embodied therein.

THE HIGH SPEED ROTARY EXHAUST FAN 89 AND ITS ELECTRIC OPERATING MOTOR 91 (FIGS. 2, 10 AND 11)

The rotary air exhaust fan 89 is a high speed air exhaust fan or blower and a typical high speed rotary exhaust fan or blower for use in the present invention is one manufactured by New York Blower Co., having a sales office at 3155 South Shields Ave., Chicago, Illinois, and known as its Model No. 369, Class 2, having an overall blade diameter of 36 inches with a so-called "Acoustifoil Wheel".

A suitable high speed electric motor 91 for use in the present invention, for driving the high speed fan or blower 89, is an electric motor manufactured by Allis Chalmers Co. of Milwaukee, Wisconsin, identified as its Model No. 125, 40 H. P. motor having a speed of 1760 R.P.M., and operating on 234 volt 60 cycle A.C. current.

THE ADJUSTABLE VACUUM AND STATIC PRESSURE CONTROL DEVICE 130 IN THE AIR DUCT EXHAUST SYSTEM 85-86-87 (FIGS. 1, 20, 21 and 22)

Typical structural and operating characteristics of the adjustable vacuum and static pressure control device 130 (FIGS. 1, 20, 21 and 22) in the air duct exhaust system 85-86-87 are such that a proper degree of vacuum or static pressure is maintained in the vacuum chamber or housing 47, and in the rotary foraminous metal drum or cylinder 63, and at the face of the air-permeable or perforated flexible endless conveyor belt 35 which is sufficient to hold the cans 32 on the face of the perforated conveyor belt 35 as it travels over the outer peripheral surface of the rotary foraminous metal drum or cylinder 62 but is not sufficient to prevent tipped over or misaligned cans 32 from falling off the can-feeding conveyor 29 and so that such tipped over or misaligned cans will not be picked up by the rotary foraminous metal drum or cylinder 62, and so that any potential damage to the new can-conveying and can-uprighting apparatus 20 which might result from the build-up of an excessively high degree of vacuum or static pressure in the vacuum chamber or housing 47, or in the rotary foraminous metal drum or cylinder 62, or at the face of the perforated endless conveyor belt 35, will be avoided. Such potential damage might include but is not limited to the following: (a) disturbance of the air flow in the apparatus 20; (b) an increase in the power drain on, and possible overheating of, the operating motor 91 for the high speed rotary air exhaust fan 89; and (c) possible collapse of the air ducts in the air duct exhaust system 85-86-87, or other parts of the apparatus 20.

Thus, it has been found that in the use of the new can-carrying and can-uprighting apparatus 20 the degree of vacuum or static pressure in the vacuum chamber or housing 47, and in the rotary foraminous metal drum or cylinder 62, and in the air duct exhaust system 85-86-87, and through the perforated conveyor belt 35, is preferably such as to maintain approximately four inches (4 inches) of static pressure at the face of the perforated conveyor belt 35, and that to this end the position of the steel counterweights 142 on their supporting rods 141 should be adjusted so that the closure member or door 131 will be properly positioned in the door operning 132 to maintain the air flow through the air duct exhaust system sufficient to maintain the aforesaid desired degree of vacuum or static pressure, namely, approximately four inches (4 inches) of static pressure at the face of the perforated conveyor belt 35.

Typical dimensions of the door opening 132 in the wall 131 of the air duct junction 87 are as follows:

| For the Larger Unit Shown in Figs. 1 to 22, Inclusive | |
|---|---|
| Height (Top to Bottom) | Length |
| Eight Inches (8") | Thirty-Six Inches (36") |

| For the Smaller Unit Shown in Figs. 23, 24 and 25 | |
|---|---|
| Height (Top to Bottom) | Length |
| Six Inches (6") | Twenty-Four Inches (24") |

For the Steel Counterweights 142 on the Supporting Rods 141

| For the Larger Unit Shown in Figs. 1 to 22, Inclusive | | | |
|---|---|---|---|
| Number | Diameter | Length | Weight of Each |
| Two (2) | Three and One Half Inches (3-½") | Four Inches (4") | Eight Pounds (8 Lbs.) |

| For the Smaller Unit Shown in Figs. 23, 24 and 25 | | | |
|---|---|---|---|
| Number | Diameter | Length | Weight of Each |
| One (1) | Three and One Fourth Inches (3-¼") | Four Inches (4") | Eight Pounds (8 Lbs.) |

OPERATION OF THE FORM OF THE INVENTION ILLUSTRATED IN FIGS. 23, 24 AND 25

The operation of the form of the invention illustrated in FIGS. 23, 24 and 25 is substantially the same as that for the form of the invention illustrated in FIGS. 1 to 22, inclusive, except that it is intended for smaller or lower volume production and employs a single unidirectional delivery or take-away conveyor 64b which receives the entire output or can capacity of the perforated endless conveyor belt 35b.

It will thus be seen from the foregoing description, considered in conjunction with the accompanying drawings, that the present invention provides a new and improved can-conveying and can-uprighting apparatus having the desirable advantages and characteristics and accomplishing its intended objects including those hereinbefore pointed out and others which are inherent in the invention.

I claim:

1. A vacumm operated can-conveying and can-uprighting apparatus for uprighting a bank of cans received from a can washer or first work station in inverted position, that is, with the open tops of the cans facing downwardly and the closed bottom walls thereof facing upwardly and conveying the said bank of cans in upright position to a can printing or labeling apparatus, or other work station, comprising (a) a supporting frame;
(b) a rotary foraminous drum or cylinder rotatably mounted on the said supporting frame and having openings formed in its external cylindrical peripheral surface;
(c) a perforated endless flexible conveyor belt constructed and arranged to travel over and in contact with the said open external cylindrical peripheral surface of the said rotary foraminous drum or cylinder through an arc of travel sufficient to upright the cans from an inverted position, said belt having
 (1) a generally horizontal bottom run; and
 (2) a generally horizontal upper run;
(d) a vacuum chamber or housing mounted on the supporting frame with the body of the drum projecting radially into the interior of the vacuum chamber, and the vacuum chamber thereby having communication with the said open external cylindrical peripheral surface of the said foraminous drum or cylinder and with the portion of said perforated endless flexible conveyor belt in contact therewith
(e) can delivery of take-away conveyor means for receiving the bank of uprighted cans from the said generally horizontal upper run of the said perforated endless flexible conveyor belt and for delivering the said uprighted cans to a printing and labeling apparatus or other work station;
(f) can-conveying means for conveying said bank of cans from a can washer in inverted position below and in a direction generally parallel and in close spaced proximity to the said generally horizontal bottom run of the said perforated endless flexible conveyor belt;
(g) means for creating vacuum in the said vacuum chamber or housing and from said vacuum chamber through the openings in the said rotary foraminous drum or cylinder and through the said perforated endless flexible conveyor belt whereby the said bank of cans are gripped by vacuum applied from the said vacuum chamber or housing through the said rotary foraminous drum and said perforated endless flexible conveyor belt to the closed bottom walls of the said cans and transported from said can conveying means to said endless belt and thence are carried by the said perforated endless flexible conveyor belt around the said external peripheral surface of the said rotary foraminous drum or cylinder by said vacuum applied to the bottom walls of the cans, the cans being uprighted as they travel over the said horizontal upper run of the said perforated endless flexible conveyor belt to the said can delivery or takeway means.

2. A vacuum operated can-conveying and can-uprighting apparatus defined in claim 1 in which
   (a) the said arc of travel of the said perforated endless flexible conveyor belt over the said open external cylindrical peripheral surface of the said rotary foraminous drum or cylinder is approximately one hundred and eighty degrees (180°).

3. A vacuum operated can-conveying and can-uprighting apparatus as defined in claim 1 in which the said means for creating vacuum in the said vacuum chamber or housing includes
   (a) air exhaust duct means having communication with the said vacuum chamber or housing;
   (b) rotary air-exhausting fan means having communication with the said air exhaust duct means; and
   (c) electric motor means for operating the said rotary air-exhausting means.

4. A vacuum operated can-conveying and can-uprighting apparatus as defined in claim 1 in which
   (a) the said open area of the said rotary foraminous drum or cylinder which is exposed to the said perforated flexible endless conveyor belt is in the order of seventy (70%) percent of the total area of the said external cylindrical peripheral surface of the said rotary foraminous drum or cylinder in contact with said belt.

5. A vacuum operated can-conveying and can-uprighting apparatus as defined in claim 1 in which
   (a) the open area of the said perforated flexible endless conveyor belt which is exposed to the said open area of the said external cylindrical peripheral surface of the said rotary foraminous drum or cylinder is approximately fifteen percent (15%) of the area of the perforated flexible endless conveyor belt traveling over the said external peripheral surface of the said rotary foraminous metal drum or cylinder.

6. A vacuum operated can-conveying and can-uprighting apparatus as defined in claim 1 in which
   (a) the said means for creating vacuum in the said vacuum chamber or housing creates a vacuum in the said vacuum chamber or housing in the order of 2.5 inches of static pressure.

7. A vacuum operated can-conveying and can-uprighting apparatus as defined in claim 1 which includes
   (a) adjustable means for raising and lowering the said vacuum chamber or housing, the said rotary foraminous drum or cylinder, the said perforated flexible endless conveyor belt, and the said air exhaust duct means as a unit relative to the said can-conveying means so as to accommodate the said can-conveying means and the said generally horizontal bottom run of the said perforated flexible endless conveyor belt to cans of varying heights and sizes.

8. A vacuum operated can-conveying and can-uprighting apparatus as defined in claim 1 which includes
   (a) means for adjustably mounting the said vacuum chamber or housing, the said rotary drum or cylinder, and the said perforated flexible conveyor, as an assembly, on the said supporting frame for vertical movement relative to the said can-conveying means so as to vary the vertically spaced relationship of the said assembly relative to the said can-conveying and can-uprighting apparatus to cans of various sizes and heights.

9. A vacuum operated can-conveying and can-uprighting apparatus as defined in claim 1 which includes
   (a) means for operating the said perforated flexible conveyor, and in which
   (b) the said generally horizontal upper run of the said perforated flexible conveyor includes
      (1) an output or delivery end; and in which
   (c) the said can-conveying and can-uprighting apparatus includes can-delivery or take-away means for receiving the uprighted cans from the said output or delivery end of the said generally horizontal run of the said perforated flexible conveyor; and in which
      (1) the said can-delivery or take-away means includes
         a. a pair of oppositely moving can take-away conveyors adjacent the said output or delivery end of the said generally horizontal upper run of the said perforated flexible conveyor and each adapted to receive a part of the uprighted cans from the said output or delivery end of the said perforated flexible conveyor and to convey the said uprighted cans to a can printing or labeling apparatus or other work station.

10. A vacuum operated can-conveying and can-uprighting apparatus as defined in claim 1 which includes
    (a) means for operating the said perforated flexible conveyor belt and in which
    (b) the said generally horizontal upper run of the said perforated flexible conveyor belt has
       (1) an output or delivery end and in which
    (c) the said can-delivery or take-away means includes
       (1) a single unidirectional take-away or delivery conveyor arranged adjacent the said output or delivery end of the said upper run of the said perforated flexible conveyor belt which is adapted to receive the entire output of the uprighted cans from the said output or delivery end of the said upper run of the said perforated flexible conveyor belt and to convey them to the said can printing or labeling or other work station.

11. A vacuum operated can-conveying and can-uprighting apparatus as defined in claim 1 in which the said means for creating vacuum in the said vacuum chamber or housing includes
    (a) air exhaust duct means having communication with the said vacuum chamber or housing;
    (b) rotary air-exhausting fan means having communication with the said air exhaust duct means;
    (c) electric motor means for operating the said rotary air-exhausting means; and
    (d) adjustable means for raising and lowering the said vacuum chamber or housing and the said rotary foraminous flexible endless conveyor belt as a unit relative to the said can-conveying means so as to accommodate the said can-conveying means and the said generally horizontal bottom run of the said perforated flexible endless conveyor belt to cans of varying heights and sizes.

12. A vacuum operated can-conveying and can-uprighting apparatus as defined in claim 11 in which the said air exhaust duct means includes (a) an air duct having an opening therein from the interior of the said air duct to the atmosphere; and
(b) a closure member movably mounted on the said air duct for movement into position inwardly of the said air duct to open the said opening to an extent responsive to and in relation to the closed perforated area of the said perforated conveyor belt which is closed by the cans carried thereby around the said rotary foraminous drum or cylinder; and
(c) means normally urging the said closure member into position to close the said air duct opening.

13. A vacuum operated can-conveying and can-uprighting apparatus as defined in claim 11 in which the said air exhaust duct means includes
(a) an air duct having an opening therein from the interior of the said air duct to the atmosphere;
(b) a closure member in the form of a door hingedly mounted on the said air duct for movement into position inwardly of the said air duct to open the said opening to an extent responsive to and in relation to the closed perforated area of the said perforated conveyor belt which is closed by the cans carried thereby around the said rotary foraminous metal drum or cylinder; and
(c) means normally urging the said closure door member into position to close the said opening in the said air duct.

14. A vacuum operated can-conveying and can-uprighting apparatus as defined in claim 13 in which
(a) the said means normally urging the said closure door member into position to close the said opening in the said air duct is in the form of
(1) counterbalance means attached to the closure door member and extending exteriorly of the said closure door member and exteriorly of the said air duct.

15. A vacuum operated can-conveying and can-uprighting apparatus as defined in claim 60 which includes
(a) supporting means for the said counterbalance means attached to and projecting exteriorly of the said closure door member and air duct; and
(b) means for adjusting the said counterbalance means on the said supporting means toward and away from the said closure door member.

16. A vacuum operated can-conveying and can uprighting apparatus as defined in claim 1 wherein said vacuum chamber or housing includes
(1) a perforated wall disposed above and in close proximity to the said generally horizontal bottom run of the said perforated endless flexible belt and wherein the vacuum from said vacuum chamber or housing is also applied through the said perforated bottom wall of the said vacuum chamber or housing.

17. A vacuum operated can-conveying and can uprighting apparatus as defined in claim 16 and further comprising
(h) a first adjustable vacuum control means including
(1) a first adjustable member adjustably mounted in the said vacuum chamber or housing and on the said perforated bottom wall thereof for supplying a controlled degree of vacuum from the said vacuum chamber or housing through the said perforated bottom wall of the said vacuum chamber or housing and through the said generally horizontal bottom run of the said perforated endless flexible conveyor belt against the said closed bottom walls of the said cans sufficient to lift the said cans off the said can-conveying means and cause them to adhere to the said generally horizontal bottom run of the said perforated endless flexible conveyor belt as the said perforated endless flexible conveyor belt travels over and above the said can-conveying means; and
(i) a second adjustable vacuum control means mounted in the said vacuum chamber or housing including
(1) a second adjustable member adjustably mounted on a perforated top wall section of the said vacuum chamber or housing for controlling the degree of vacuum supplied from the said vacuum chamber or housing through the said perforated top wall section of the said vacuum chamber or housing and through the generally horizontal upper run of the said perforated endless flexible conveyor belt to the said bottom walls of the said cans after the cans have completed their arc of travel over the said open external cylindrical peripheral surface of the said rotary foraminous drum or cylinder and have been uprighted and are carried by the said generally horizontal upper run of the said perforated endless flexible conveyor belt to the said can-delivery or take-away conveyor means.

18. A vacuum operated can-conveying and can-uprighting apparatus as defined in claim 17 in which the said first adjustable vacuum control means includes
(a) an auxiliary housing mounted in the said vacuum chamber or housing above the said perforated bottom wall of the said vacuum chamber or housing and which includes
(1) a stationary section attached to a wall of the said vacuum chamber or housing; and
(2) in which the said first adjustable member extends over and is adjustable relative to a portion of the said perforated bottom wall of the said vacuum chamber or housing so as to vary and control the area of the said perforated bottom wall of the said vacuum chamber or housing which is in communication with the said generally horizontal bottom run of the said perforated flexible endless conveyor belt and the degree of vacuum or static pressure thus applied through the perforated flexible exndless conveyor belt to the upright bottom walls of the cans on the said can-conveying means as the inverted cans are lifted off the said can-conveying means onto the said perforated flexible endless conveyor belt.

19. A vacuum operated can-conveying and can-uprighting apparatus as defined in claim 17 in which the said second and adjustable vacuum control means includes
(a) an auxiliary housing mounted in the said vacuum chamber or housing below the said perforated top wall section of the said vacuum chamber or housing; and including
(1) a stationary section attached to a wall of the said vacuum chamber or housing; and in which the said
(2) second adjustable member extends under and is adjustable relative to the said perforated top wall section of the said vacuum chamber or housing so as to vary and control the area of the said perforated top wall section which is in communication with the said generally horizontal upper run of the said perforated flexible endless conveyor belt as the uprighted cans are carried by the said generally horizontal upper run of the said perforated flexible endless conveyor belt away from the said rotary foraminous metal drum or cylinder.

20. A vacuum oeprated can-conveying and can-uprighting apparatus as defined in claim 19 in which the said first vacuum control means provides a vacuum therein in the order of 1.75 inches of static pressure.

21. A vacuum operated can-conveying and can-uprighting apparatus as defined in claim 17 in which
   (a) the said second vacuum control means provides a vacuum therein in the order of 1.75 inches of static pressure.

22. A vacuum operated can-conveying and can-uprighting apparatus for uprighting cans received from a can washer in inverted position, that is, with the open tops of the cans facing downwardly and the closed bottom walls thereof facing upwardly and conveying the cans in upright position to a can printing or labeling apparatus, or other work station, comprising
   (a) a supporting frame;
   (b) a rotary foraminous metal drum or cylinder rotatably mounted on the said supporting frame and having
      (1) an open external cylindrical peripheral surface;
   (c) a perforated endless flexible conveyor belt adapted to travel over and in contact with the said open external cylindrical peripheral surface of the said rotary foraminous metal drum or cylinder through an arc of travel sufficient to upright the cans from an inverted position, and having
      (1) a generally horizontal bottom run; and
      (2) a generally horizontal upper run;
   (d) a vacuum chamber or housing mounted on the supporting frame and having communication with the said open external cylindrical peripheral surface of the said foraminous metal drum or cylinder and with the said perforated endless flexible conveyor belt radially inwardly of the said open external cylindrical surface of the said rotary foraminous metal drum or cylinder, and having
      (1) a perforated bottom wall disposed above and in close proximity to the said generally horizontal bottom run of the said perforated endless flexible conveyor belt;
   (e) can delivery or take-away conveyor means for receiving the uprighted cans from the said generally horizontal upper run of the said perforated endless flexible conveyor belt and for delivering the said uprighted cans to a printing and labeling apparatus or other work station;
   (f) can-conveying means for conveying cans from a can washer in inverted position below and in a direction generally parallel to and in coplanar relationship with and in close proximity to the said generally horizontal bottom run of the said perforated endless flexible conveyor belt with the said closed bottom walls of the said cans below but in close proximity to the said generally horizontal bottom run of the said perforated endless flexible conveyor belt;
   (g) means for creating vacuum in the said vacuum chamber or housing and in the said rotary foraminous metal drum or cylinder and through the said perforated endless flexible conveyor belt whereby the cans are lifted off the can-conveying means by vacuum applied from the said vacuum chamber or housing through the said perforated bottom wall of the said vacuum chamber or housing and through the said perforated endless conveyor belt to the closed bottom walls of the said cans and the cans are carried by the said perforated endless flexible conveyor belt around the said external peripheral surface of the said rotary foraminous metal drum or cylinder by vacuum applied to the bottom walls of the cans through the said rotary formainous metal drum or cylinder and the said perforated endless flexible conveyor belt and the cans are uprighted as they travel over the said horizontal upper run of the said perforated endless flexible conveyor belt to the said can delivery or take-away conveyor means;
   (h) the said means for creating vacuum in the said vacuum chamber or housing including
      (1) air exhaust duct means having communication with the said vacuum chamber or housing;
      (2) rotary air-exhausting fan means having communicatiion with the said air exhaust duct means; and
      (3) electric motor means for operating the said rotary air-exhausting means;
   (i) adjustable means for raising and lowering the said vacuum chamber or housing, the said rotary foraminous metal drum or cylinder, and the said perforated flexible endless conveyor belt as a unit relative to the said can-conveying means so as to accommodate the said can-conveying means and the said generally horizontal bottom run of the said perforated flexible endless conveyor belt to cans of varying heights and sizes; and
   (j) the said air-exhaust duct means including
      (1) a flexible expansible and contractible section which enables the said air exhaust duct means to be raised and lowered with the said vacuum chamber or housing, the said rotary foraminous metal drum or cylinder and the said perforated flexible endless conveyor belt, as a unit, relative to the said can-conveying means.

23. A vacuum operated can-conveying and can-uprighting apparatus for uprighting cans received from a can washer in inverted position, that is, with the open tops of the cans facing downwardly and the closed bottom walls thereof facing upwardly and conveying the cans in upright position to a can printing or labeling apparatus, or other work station, comprising:
   (a) a supporting frame;
   (b) a rotary formanious metal drum or cylinder rotatably mounted on the said supporting frame and having
      (1) an open external cylindrical peripheral surface;
   (c) a perforated endless flexible conveyor belt adapted to travel over and in contact with the said open external cylindrical peripheral surface of the said rotary formanious metal drum or cylinder through an arc of travel sufficient to upright the cans from an inverted position, and having
      (1) a generally horizontal bottom run; and
      (2) an generally horizontal upper run;
   (d) a vacuum chamber or housing mounted on the supporting frame and having communication with the said open external cylindrical peripheral surface of the said foraminous metal drum or cylinder and with the said perforated endless flexible conveyor belt radially inwardly of the said open external cylindrical surface of the said rotary foraminous metal drum or cylinder, and having
  (1) a perforated bottom wall disposed above and in close proximity to the said generally horizontal bottom run of the said perforated endless flexible conveyor belt;
(e) can delivery or take-away conveyor means for receiving the uprighted cans from the said generally horizontal upper run of the said perforated endless flexible conveyor belt and for delivering the said uprighted cans to a printing and labeling apparatus or other work station;
(f) can-conveying means for conveying cans from a can washer in inverted position below and in a direction generally parallel to and in coplanar relationship with and in close proximity to the said generally horizontal bottom run of the said perforated endless flexible conveyor belt with the said closed bottom walls of the said cans below but in close proximity to the said generally horizontal bottom run of the said perforated endless flexible conveyor belt;
(g) means for creating vacuum in the said vacuum chamber or housing and in the said rotary foraminous metal drum or cylinder and through the said perforated endless flexible conveyor belt whereby the cans are lifted off the can-conveying means by vacuum applied from the said vacuum chamber or housing through the said perforated bottom wall of the said vacuum chamber or housing and through the said perforated endless flexible conveyor belt to the closed bottom walls of the said cans and the cans are carried by the said perforated endless flexible conveyor belt around the said external peripheral surface of the said rotary foraminous metal drum or cylinder by vacuum applied to the bottom walls of the cans through the said rotary foraminous metal drum or cylinder and the said perforated endless flexible conveyor belt and the cans are uprighted as they travel over the said horizontal upper run of the said perforated endless flexible conveyor belt to the said can delivery or take-away conveyor means;
(h) the said means for creating vacuum in the said vacuum chamber or housing including
  (1) air exhaust duct means having communication with the said vacuum chamber or housing;
  (2) rotary air-exhausting fan means having communication with the said air exhaust duct means; and
  (3) electric motor means for operating the said rotary air-exhausting means;
(i) adjustable means for raising and lowering the said vacuum chamber or housing, the said rotary foraminous metal drum or cylinder, the said perforated flexible endless conveyor belt and the said air exhaust duct means as a unit relative to the said can-conveying means so as to accommodate the said can-conveying means and the said generally horizontal bottom run of the said perforated flexible endless conveyor belt to cans of varying heights and sizes; and
(j) the said adjustable means for raising and lowering the said vacuum chamber or housing, the said rotary foraminous metal drum or cylinder, the said perforated flexible endless conveyor belt, and the said air exhaust duct means as a unit relative to the said can-conveying means, including
  (1) adjustable screw means mounted on the said supporting frame and attached to the said vacuum chamber or housing.

24. A vacuum operated can-conveying and can-uprighting apparatus for uprighting cans received from a can washer in inverted position, that is, with the open tops of the cans facing downwardly and the closed bottom walls thereof facing upwardly and conveying the cans in upright position to a can printing or labeling apparatus, or other work station, comprising
(a) a supporting frame;
(b) a rotary foraminous metal drum or cylinder rotatably mounted on the said supporting frame and having
  (1) an open external cylindrical peripheral surface;
(c) a perforated endless flexible conveyor belt adapted to travel over and in contact with the said open external cylindrical peripheral surface of the said rotary foraminous metal drum or cylinder through an arc of travel sufficient to upright the cans from an inverted position, and having
  (1) a generally horizontal bottom run; and
  (2) a generally horizontal upper run;
(d) a vacuum chamber or housing mounted on the supporting frame and having communication with the said open external cylindrical peripheral surface of the said foraminous metal drum or cylinder and with the said perforated endless flexible conveyor belt radially inwardly of the said open external cylindrical surface of the said rotary foraminous metal drum or cylinder, and having
  (1) a perforated bottom wall disposed above and in close proximity to the said generally horizontal bottom run of the said perforated endless flexible conveyor belt;
(e) can delivery or take-away conveyor means for receiving the uprighted cans from the said generally horizontal upper run if the said perforated endless flexible conveyor belt and for delivering the said uprighted cans to a printing and labeling apparatus or other work station;
(f) can-conveying means for conveying cans from a can washer in inverted position below and in a direction generally parallel to and in coplanar relationship with and in close proximity to the said generally horizontal bottom run of the said perforated endless flexible conveyor belt with the said closed bottom walls of the said cans below but in close proximity to the said generally horizontal bottom run of the said perforated endless flexible conveyor belt;
(g) means for creating vacuum in the said vacuum chamber or housing and in the said rotary foraminous metal drum or cylinder and through the said perforated endless flexible conveyor belt whereby the cans are lifted off the can-conveying means by vacuum applied from the said vacuum chamber or housing through the said perforated bottom wall of the said vacuum chamber or housing and through the said perforated endless flexible conveyor belt to the closed bottom walls of the said cans and the cans are carried by the said perforated endless flexible conveyor belt around the said external peripheral surface of the said rotary foraminous metal drum or cylinder by vacuum applied to the bottom walls of the cans through the said rotary foraminous metal drum or cylinder and the said perforated endless flexible conveyor belt and the cans are uprighted as they travel over the said horizontal upper run of the said perforated endless flexible conveyor belt to the said can delivery or take-away conveyor means;

(h) the said means for creating vacuum in the said vacuum chamber or housing include (1) an air duct exhaust sytem for exhausting air from the said vacuum chamber or housing to the atmosphere and for creating a degree of vacuum or static pressure in the said vacuum chamber or housing sufficient to hold the said cans on the said perforated conveyor belt as the cans are carried thereby around the said rotary foraminous metal drum or cylinder; and (2) vacuum control means in the said air duct exhaust system for automatically adjusting the degree of vacuum or static pressure in the said vacuum chamber or housing and in the said air duct exhaust system in relation to the closed perforated area of the said perforated conveyor belt represented by the number of holes or perforations therein which are closed by the cans as they are carried by the said perforated conveyor belt around the said rotary foraminous metal drum or cylinder;

(i) the said means for creating vacuum in the said vacuum chamber or housing including (1) an air duct having an opening therein from the interior of the said air duct to the atmosphere;

(2) a closure member movably mounted on the said air duct for movement inwardly of the said air duct for movement of the said closure member into position inwardly of the said air duct to open the said opening to an extent responsive to and in relation to the closed perforated area of the said perforated conveyor belt which is closed by the cans carried thereby around the said rotary foraminous metal drum or cylinder; and (3) means normally urging the said closure member into position to close the said opening;

(j) the said closure member being in the form of a closure door hingedly mounted on the said air duct;

(k) the said means normally urging the said closure door into position to close the said opening being in the form of (1) counterbalance means attached to the closure door and extending exteriorly of the said closure door and exteriorly of the said air duct;

(l) supporting means for the said counterbalance means attached to and projecting exteriorly of the said closure door and air duct;

(m) means for adjusting the said counterbalance means on the said supporting means toward and away from the said closure door;

(n) the said supporting means for the said counterbalance means including (1) a supporting rod member attached to the said closure door on the outer side thereof and projecting exteriorly of the said closure door and air duct;

(o) the said counterbalance means being in the form of (1) a counterbalance weight adjustably mounted on the said supporting rod member and adapted to be adjusted thereon toward and away from the said closure door and air duct; and (p) means for retaining the said counterbalance weight in an adjusted position of the said supporting rod member.

25. A vacuum operated can-conveying and can-uprighting apparatus for uprighting cans received from a can washer in inverted position, that is, with the open tops of the cans facing downwardly and the closed bottom walls thereof facing upwardly and conveying the cans in upright position to a can printing or labeling apparatus, or other work station, comprising (a) a supporting frame;

(b) a rotary foraminous metal drum or cylinder rotatably mounted on the said supporting frame and having (1) an open external cylindrical peripheral surface;

(c) a perforated endless flexible conveyor belt adapted to travel over and in contact with the said open external cylindrical peripheral surface of the said rotary foraminous metal drum or cylinder through an arc of travel sufficient to upright the cans from an inverted position, and having (1) a generally horizontal bottom run; and (2) a generally horizontal upper run;

(d) a vacuum chamber or housing mounted on the supporting frame and having communication with the said open external cylindrical peripheral surface of the said perforated endless flexible conveyor belt radially inwardly of the said open external cylindrical surface of the said rotary foraminous metal drum or cylinder, and having (1) a perforated bottom wall disposed above and in close proximity to the said generally horizontal bottom run of the said perforated endless flexible conveyor belt;

(e) can delivery or take-away conveyor means for receiving the uprighted cans from the said generally horizontal upper run of the said perforated endless flexible conveyor belt and for delivering the said uprighted cans to a printing and labeling apparatus or other work station;

(f) can-conveying means for conveying cans from a can washer in inverted position below and in a direction generally parallel to and in coplanar relationship with and in close proximity to the said generally horizontal bottom run of the said perforated endless flexible conveyor belt with the said closed bottom walls of the said cans below but in close proximity to the said generally horizontal bottom run of the said perforated endless flexible conveyor belt;

(g) means for creating vacuum in the said vacuum chamber or housing and in the said rotary foraminous metal drum or cylinder and through the said perforated endless flexible conveyor belt whereby the cans are lifted off the can-conveying means by vacuum applied from the said vacuum chamber or housing through the said perforated bottom wall of the said vacuum chamber or housing and through the said perforated endless flexible conveyor belt to the closed bottom walls of the said cans and the cans are carried by the said perforated endless flexible conveyor belt around the said external peripheral surface of the said rotary foraminous metal drum or cylinder by vacuum applied to the bottom walls of the cans through the said rotary foraminous metal drum or cylinder and the said perforated endless flexible conveyor belt and the cans are uprighted as they travel over the said horizontal upper run of the said perforated endless flexible conveyor belt to the said can delivery or take-away conveyor means;

(h) the said means for creating vacuum in the said vacuum chamber or housing including
  (1) an air duct exhaust system for exhausting air from the said vacuum chamber or housing to the armosphere and for creating a degree of vacuum or static pressure in the said vacuum chamber or housing sufficient to hold the said cans on the said perforated conveyor belt as the cans are carried thereby around the said rotary foraminous metal drum or cylinder; and
  (2) vacuum control mens in the said air duct exhaust system for automatically adjusting the degree of vacuum or static pressure in the said vacuum chamber or housing and in the said air duct exhaust system in relation to the closed perforated area of the said perforated conveyor belt represented by the number of holes or perforations therein which are closed by the cans as they are carried by the said perforated conveyor belt around the said rotary foraminous metal drum or cylinder;

(i) the said air duct exhaust system including
  (1) an air duct having an opening therein from the interior of the said air duct to the atmosphere;
  (2) a closure member movably mounted on the said air duct for movement inwardly of the said air duct for movement of the said closure member into position inwardly of the said air duct to open the said opening to an extent responsive to and in relation to the closed perforated area of the said perforated conveyor belt which is closed by the cans carried thereby around the said rotary foraminous metal drum or cylinder;
  (3) means normally urging the said closure member into position to close the said opening;

(j) the said closure member being in the form of a closure door hingedly mounted on the said air duct;

(k) the said means normally urging the said closure door into position to close the said opening being in the form of
  (1) counterbalance means attached to the closure door and extending exteriorly of the said closure door and exteriorly of the said air duct;

(l) supporting means for the said counterbalance means attached to and projecting exteriorly of the said closure door and air duct;

(m) means for adjusting the said counterbalance means on the said supporting means toward and away from the said closure door;

(n) the said supporting means for the said counterbalance means including
  (1) a supporting rod member attached to the said closure door on the outer side thereof and projecting exteriorly of the said closure door and air duct;

(o) the said counterbalance means being in the form of
  (1) a counterbalance weight adjustably mounted on the said supporting rod member and adapted to be adjusted thereon toward and away from the said closure door and air duct;

(p) means for retaining the said counterbalance weight in adjusted position on the said supporting rod member;

(q) the said supporting means for the said counterbalance means including
  (1) a pair of said supporting rod members; and (r) the said counterbalance means including
  (1) a counterbalance weight on each of the said supporting rod members.

26. A vacuum operated can-conveying and can-uprighting apparatus for uprighting cans received from a can washer in inverted position, that is, with the open tops of the cans facing downwardly and the closed bottom walls thereof facing upwardly, and conveying the cans in upright position to a can printing or labeling apparatus, or other work station, comprising (a) a supporting frame;

(b) a rotary foraminous metal drum or cylinder rotatably mounted on the said supporting frame and having
  (1) an open external cylindrical peripheral surface;

(c) a perforated flexible endless conveyor belt adapted to travel over and in contact with the said open external cylindrical peripheral surface of the said rotary foraminous metal drum or cylinder through an arc of travel sufficient to upright the cans from an inverted position, and having
  (1) a generally horizontal bottom run; and
  (2) a generaly horizontal upper run;

(d) a vacuum chamber or housing mounted on the supporting frame and having communication with the said open external cylindrical peripheral surface of the said foraminous metal drum or cylinder and with the said perforated flexible endless conveyor belt radially inwardly of the said open external cylindrical surface of the said rotary foraminous metal drum or cylinder, and having
  (1) a generally horizontally extending perforated bottom wall section disposed above and in close proximity to the said generally horizontal bottom run of the said perforated flexible endless conveyor belt; and
  (2) a generally horizontally extending perforated top wall section disposed under and in close proximity to the said generally horizontal upper run of the said perforated flexible endless conveyor belt;

(e) can-conveying means for conveying cans from a can washer in inverted position below and in a direction generally parallel to and in coplanar relationship with and in close proximity to the said generally horizontal bottom run of the said perforated flexible endless conveyor belt with the said closed bottom walls of the said cans disposed below but in close proximity to the said generally horizontal bottom run of the said perforated flexible endless conveyor belt;

(f) can delivery or take-away conveyor means for receiving the uprighted cans from the said generally horizontal upper run of the said perforated flexible endless conveyor belt and for delivering the said uprighted cans to a printing and labeling apparatus or other work station;

(g) means for creating vacuum in the said vacuum chamber or housing and in the said rotary foraminous metal drum or cylinder and through the said perforated flexible endless conveyor belt whereby the cans are lifted off the can-conveying means by vacuum applied from the said vacuum chamber or housing through the said perforated bottom wall of the said vacuum chamber or housing and through the said perforated flexible endless conveyor belt to the closed bottom walls of the said cans and the cans are carried by the said perforated flexible endless conveyor belt around the said external peripheral surface of the said rotary foraminous metal drum or cylinder by vacuum applied to the bottom walls of the cans through the said rotary foraminous metal drum or cylinder and through the said perforated flexible endless conveyor belt and the cans are uprighted as they travel over the said horizontal upper run of the said perforated flexible endless conveyor belt to the said can delivery or take-away conveyor means;

(h) a first adjustable vacuum control means including
  (1) a first adjustable member adjustably mounted in the said vacuum chamber or housing and on the said perforated bottom wall thereof for supplying a controlled degree of vacuum from the said vacuum chamber or housing through the said perforated bottom wall of the said vacuum chamber or housing and through the said generally horizontal bottom run of the said perforated flexible endless conveyor belt against the said closed bottom walls of the said cans sufficient to lift the cans off the said can-conveying means and cause them to adhere to the said generally horizontal bottom run of the said perforated flexible endless conveyor belt as the said perforated flexible endless conveyor belt travels over and above the said can-conveying means;

(i) a second adjustable vacuum control means mounted in the said vacuum chamber or housing including
  (1) a second adjustable member adjustably mounted on the said perforated top wall section of the said vacuum chamber or housing for controlling the degree of vacuum supplied from the said vacuum chamber or housing through the said perforated top wall section of the said vacuum chamber or housing and through the generally horizontal upper run of the said perforated flexible endless conveyor belt to the said bottom walls of the said cans after the cans have completed their arc of travel over the said open external cylindrical peripheral surface of the said rotary foraminous metal drum or cylinder and have been uprighted and are carried by the said generally horizontal upper run of the said perforated flexible endless conveyor belt to the said can-delivery or take-away conveyor means;

(j) the said first adjustable vacuum control means incuding an auxiliary housing mounted in the said vacuum chamber or housing above the said perforated bottom wall of the said vacuum chamber or housing and including
  (1) a stationary section attached to a wall of the said vacuum chamber or housing; and (k) the said first adjustable member extending over and being adjustable relative to a portion of the said perforated bottom wall of the said vacuum chamber or housing so as to vary and control the area of the said perforated bottom wall of the said vacuum chamber or housing which is in communication with the said generally horizontal bottom run of the said perforated flexible endless conveyor belt and the degree of vacuum or static pressure thus applied through the perforated flexible endless conveyor belt to the upright bottom walls of the cans on the said can-conveying means as the inverted cans are lifted off the said can-conveying means onto the said perforated flexible endless conveyor belt.

* * * * *